US009676118B2

(12) United States Patent
Mathieu et al.

(10) Patent No.: US 9,676,118 B2
(45) Date of Patent: Jun. 13, 2017

(54) FORMATION OF CEMENTITIOUS BOARD WITH LIGHTWEIGHT AGGREGATE

(71) Applicants: Maria-Andrée Mathieu, Bromont (CA); Benoit Dubé, Granby (CA); Frédéric Potvin, Granby (CA); Jacques L'Heureux, St-Anne de Larochelle (CA); Jean-Francois Brassard, Bromont (CA); Patrick Guertin, St-Alphonse de Granby (CA)

(72) Inventors: Maria-Andrée Mathieu, Bromont (CA); Benoit Dubé, Granby (CA); Frédéric Potvin, Granby (CA); Jacques L'Heureux, St-Anne de Larochelle (CA); Jean-Francois Brassard, Bromont (CA); Patrick Guertin, St-Alphonse de Granby (CA)

(73) Assignee: National Gypsum Properties, LLC, Charlotte, NC (US)

( * ) Notice: Subject to any disclaimer, the term of this patent is extended or adjusted under 35 U.S.C. 154(b) by 176 days.

(21) Appl. No.: 14/028,072

(22) Filed: Sep. 16, 2013

(65) Prior Publication Data

US 2015/0076730 A1 Mar. 19, 2015

(51) Int. Cl.

*B28B 1/52* (2006.01)
*B29D 99/00* (2010.01)
*B28B 23/00* (2006.01)

(52) U.S. Cl.

CPC .............. *B28B 1/525* (2013.01); *B28B 1/526* (2013.01); *B28B 23/0006* (2013.01); *B28B 23/0062* (2013.01); *B28B 23/0087* (2013.01)

(58) Field of Classification Search

CPC B28B 3/12; B28B 3/123; B28B 3/126; B28B 3/14; B28B 3/16; B28B 3/18; B28B 3/20–3/269; B28B 5/00–5/028; B28B 11/0845; B28B 11/10; B28B 11/22; B28B 23/0087; B28B 1/008; B28B 1/526;

(Continued)

(56) References Cited

U.S. PATENT DOCUMENTS 2,624,068 A * 1/1953 Dobry ............................. 264/39
4,050,864 A * 9/1977 Komaki ........................ 425/134

(Continued)

FOREIGN PATENT DOCUMENTS

WO WO 8603245 6/1986
WO WO 0166485 9/2001

*Primary Examiner* — Jeffrey Wollschlager
(74) *Attorney, Agent, or Firm* — Ice Miller LLP

(57) ABSTRACT

A process for the formation of highly durable cementitious board using lightweight aggregate is disclosed. The process comprises pouring a core mix onto a conveyor, wherein the core mix is comprised of one or more lightweight aggregate filler in the amount of 0.5 to 5 weight percent of the core mix, one or more binders in the amount of 35 to 75 weight percent of the core mix, rheological admixture in the amount of about 0.5 to 5 weight percent of the core mix, surfactant in the amount of 0 to 0.1 weight percent of the core mix, one or more normal weight aggregate filler in the amount of 5 to 50 weight percent of the core mix, and water in the amount of 5 to 20 weight percent of the core mix. The process further comprises passing the core mix under a screed roller to flatten the core mix to produce an extruding board with a desired thickness.

11 Claims, 15 Drawing Sheets

(58) Field of Classification Search
CPC B28B 5/026; B28B 5/02; B28B 11/08; B28B 11/0863; B28B 11/0818; B28B 11/0881; B28B 11/089; B28B 11/12; B28B 23/0081; B28B 23/0056; B28B 1/525; B28B 23/0006; B28B 23/0062; B29D 99/0021
See application file for complete search history.

(56) References Cited

U.S. PATENT DOCUMENTS

| | | | | |
|---|---|---|---|---|
| 4,450,022 | A * | 5/1984 | Galer | B28B 23/0006 118/56 |
| 4,916,004 | A | 4/1990 | Ensminger et al. | |
| 4,966,541 | A * | 10/1990 | Mistretta | 425/229 |
| 4,986,744 | A * | 1/1991 | Weisweiler et al. | 425/94 |
| 5,174,823 | A * | 12/1992 | Dario | 118/249 |
| 5,626,898 | A * | 5/1997 | Caridis et al. | 426/502 |
| 5,979,520 | A * | 11/1999 | Behrendt | 144/114.1 |
| 6,187,409 | B1 * | 2/2001 | Mathieu | 428/70 |
| 6,986,812 | B2 * | 1/2006 | Dubey et al. | 118/259 |
| 2002/0090871 | A1 | 7/2002 | Ritchie et al. | |
| 2005/0106375 | A1 * | 5/2005 | Kimura et al. | 428/294.7 |
| 2006/0292358 | A1 * | 12/2006 | Robertson et al. | 428/312.4 |
| 2010/0307657 | A1 * | 12/2010 | Diaz, Jr. | B32B 3/04 156/40 |

* cited by examiner 111
110
108
111
107
102
104

102
115
110
108
111
109
114
111
116
104

117
110
115
112
104
108
109
111
107
110
116
112
119
111
114
116
115

FORMATION OF CEMENTITIOUS BOARD WITH LIGHTWEIGHT AGGREGATE

BACKGROUND

Cementitious panel is one type of material used in the construction of buildings. One disadvantage to commonly used cementitious panel is that such panel possesses a high density and weight due to material composition. Commonly used cementitious panel is difficult to manage and use in the construction process due to its great weight per square foot. For example, standard cementitious board is approximately twice the weight per square foot of gypsum board.

Moreover, cementitious board used in the construction process may require a low permeability to increase the longevity of installation. Any introduction of additional ingredients to the composition of cementitious board may decrease durability such that the cementitious board does not pass required structural certification for use in construction.

The present invention relates to a cementitious panel comprised of a low density core surrounded by upper and lower facers of reinforcements embedded into the core or attached to it using cementitious slurry or adhesives. The core, the slurry or both can be made and/or enhanced with a low permeability to water (or water vapor) characteristic by adding ingredients to their respective compositions to achieve permeability values similar to or below those of type-15 bitumen treated felt paper.

More particularly, the present invention relates to panels or boards whose opposed broad faces are reinforced by a network of fibers which may be adhered at a surface thereof e.g. be adhered to or embedded at or just below the cementitious surfaces thereof and include a low density core using a light weight aggregate surrounded by cement paste to fuse the lightweight aggregate together. Still more particularly, the present invention relates to a cementitious board whose longitudinal edges are reinforced by a network of fibers. Such a cementitious panel or board may, for example, be a light-weight concrete panel, a tile backerboard panel, or the like.

The word "cementitious" as used herein is to be understood as referring to any material, substance or composition containing or derived from a hydraulic binder such as for example, Portland cement (see below), aluminate cement, and/or a pozzolan such as for example fly ash or blast furnace slag. The term "slurry" is to be understood as referring to a flowable mixture, e.g. a flowable mixture of water and one or more hydraulic binders and if desired or necessary, additional additives such as rheology modifiers, water reducers, chemical set control admixtures, and the like. The term "core" is to be understood as referring to a mixture of a hydraulic binders, water and aggregate (such as sand, expanded shale or clay, expanded polystyrene beads, slag and similar materials—see below), as well as, if desired or necessary, additional additives such as foaming agents, rheology modifiers, water reducers, and the like.

The term "slurry pervious reinforcing mesh" is to be understood as characterizing a mesh as being suitable for use in the preparation of a concrete panel by having openings sufficiently large to permit penetration of a cementitious slurry or a slurry component of a core mix, or a full core mix, into and through the openings so as to permit (mechanical) bonding of the mesh to the core either by for example by being cemented to the core or by being embedded in a face or surface of the core of a panel.

The expression "slurry impervious mesh" is to be understood as characterizing a mesh as being water impervious or as being able to filter out or inhibit the penetration of slurry or core solids therein so as to inhibit (mechanical) bonding of the mesh to the core by the cementitious material.

It is to be understood herein that the expression "adhered to" in relation to a reinforcing mesh component (e.g. mesh, mat, fabric, tissue, etc.) means that the mesh component may be adhered for example to a face or surface by any suitable means such as by an adhesive, by a binder, by a slurry, by a core, or by being embedded in, at or immediately beneath the surface of a respective face or surface such that the mesh component is effectively bonded to the core, i.e. a hardened or set cementitious material extends through the interstices of the fibrous layers.

Keeping the above immediate definition in mind, it is to be understood herein that the expression "adhered to said core at" in relation to a reinforcing mesh component (e.g. mesh, mat, fabric, tissue, etc.) means that the mesh component does not extend beyond the specified face, area, region, or the like, i.e. it is restricted to the specified face region etc. Thus for example in relation to a broad face reinforcing mesh indicated as being adhered to a core at a broad face means that the mesh is restricted to being adhered to the broad face.

The word "woven" as used herein is to be understood as characterizing a material such as a reinforcing fabric (e.g., mesh, tissue or the like) as comprising fibers or filaments which are oriented; oriented fibers or filaments being disposed in an organized fashion.

The word "non-woven" as used herein is to be understood as characterizing a material such as a reinforcing fabric (e.g. mat, tissue or the like) as comprising fibers or filaments which are oriented (as described above) or which are non-oriented; non-oriented fibers or filaments being disposed in random fashion.

In general, a reinforced cementitious panel or board may be fastened, or sometimes adhered, to a wall, or a wall frame, for the construction of a wall and particularly for the construction of a wall where high moisture conditions are to be encountered. Such a wall panel may provide a long lasting substrate for humid or wet areas such as shower rooms and bath rooms and provide high impact resistance where there is high number of people circulating. Exterior installations are also encountered. For example, such a reinforced cementitious panel or board may be used as a substrate for ceramic tile in bath rooms, shower rooms, locker rooms, swimming pool rooms and other areas where the wall are subject to frequent splashing of water and high humidity. For exterior installations, such a reinforced cementitious panel or board may be used as a substrate for a stucco wall system or a masonry veneer wall system. Once the panel is affixed to a wall frame a wall facing material may, as desired or necessary, in turn be affixed thereto such as, for example, ceramic tile, thin brick, thin marble panels, stucco or the like. Reinforced cementitious panels or boards having cores formed of a cementitious composition with the faces being reinforced with a layer of fabric bonded thereto are known; see for example U.S. Pat. No. 1,439,954, U.S. Pat. No. 3,284,980, U.S. Pat. No. 4,450,022, U.S. Pat. No. 4,916,604, etc. Further, cementitious panels or boards with reinforced edges are known; see for example, U.S. Pat. No. 6,187,409.

Various processes for the preparation of such cementitious boards or panels are also known. British Patent application No. 2,053,779 for example discloses a method for the continuous production of a building board which comprises advancing a pervious fabric on a lower support surface, depositing a slurry of cementitious material onto the advancing fabric, contacting the exposed face of the slurry with a second fabric such that the slurry penetrates through the fabric to form a thin, continuous film on the outer faces of the fabric.

Because of its cementitious nature, a cement board may have a tendency to be relatively brittle.

Cementitious wall board or panels are often attached at their marginal edges to the building framework with for example fasteners such as nails, screws and the like. When fasteners for example such as screws or nails are installed near the edge (less than ½), it is highly desirable that the edge be able to retain sufficient structural integrity such that the panel remains attached to a wall member, i.e. that the panel have a relatively high fastener pull resistance such that the fastener will not laterally pull through or break through the board edge easily.

It is known to augment the strength of the border edge regions by wrapping the fabric covering one broad face of the board around the edge so as to overlay the fabric on the other opposite broad side thereof.

U.S. Pat. No. 4,916,004, for example, discloses a cement board having a woven mesh of glass fibers immediately below each face thereof, the mesh in one broad face continuing under the surface of both longitudinal edge faces, with the two meshes in an abutting or an overlapping relation along the longitudinal margins of the opposite face. Please also see U.S. Pat. Nos. 5,221,386 and 5,350,554.

U.S. Pat. No. 4,504,533, for example, discloses a gypsum board in which a composite web of a non-woven fiberglass felt and a woven fiberglass mat covers the upper and lower faces of a gypsum core while only the lower non-woven fiberglass felt is wrapped around the longitudinal edges of the gypsum core so that the non-woven fiberglass felt extends partially inward on the upper face of the core such that the border edge regions are covered only by non-woven fiberglass felt.

U.S. Pat. No. 1,787,163 on the other hand discloses a gypsum board in which side edge portions include a separate strip of U-shaped fabric extending from one broad face across the edge to the other broad face; the fabric legs of this separate strip each extend into the plaster core body beneath a respective sheet of fibrous material covering a respective broad face, i.e. the legs are submerged below the broad face and in particular below the broad face reinforcement means.

It would be advantageous to be able to have an alternate manner of making an alternative type panel configured such that when a nail, screw or like shaft fastener is inserted close to the edge of a panel the mesh reinforced edge may minimize edge break out by the nail or screw or like shaft fastener of edge and thus provide secure attachment of the panel to a framing support.

It would for example be advantageous to be able to customize the reinforcement characteristics of the longitudinal edge area of a panel by being able to choose a desired reinforcement mesh component which is different from the mesh used for the broad faces of a wall panel core and being able to choose a desired attachment technique to the longitudinal edge. It would be advantageous for example too be able to have a panel or board wherein the edge reinforcing mesh may be different from the broad face reinforcing mesh (e.g. of a different substance, of different mesh openings, of non-oriented fibers or filaments rather than oriented fibers or filaments).

It would be advantageous to be able to have a panel wherein the longitudinal edge face of the panel may be more or less free of cementitious material so as to allow the longitudinal edge face to be used as a support substrate for a visual indicia such as color, images, symbols, words, etc., i.e. such that an indicia would not be covered up during the manufacturing process by cementitious material.

It would be advantageous to be able to have a means of treating the side edges of the board in the course of manufacture in such a manner as to enhance its structural qualities and its use for the purposes intended. It in particular would be advantageous to be able to have a means of manufacturing the edges of the board in such a manner that it will have impact resistant edges and be able to be constructed so as to be able to offer a relatively higher lateral fastener pull resistance in the edge area than in the central core area or than a board not having such reinforced edges.

It would be advantageous to change the recipe for cementitious board to include at least one lightweight aggregate as to decrease the overall weight and density of the board while maintaining low permeability.

SUMMARY

In at least one embodiment of the present disclosure, a process for the formation of highly durable cementitious board using lightweight aggregate comprises pouring a core mix onto a conveyor, wherein the core mix is comprised of one or more lightweight aggregate filler in the amount of 0.5 to 5 weight percent of the core mix, one or more binders in the amount of 35 to 75 weight percent of the core mix, rheological admixture in the amount of about 0.5 to 5 weight percent of the core mix, surfactant in the amount of 0 to 0.1 weight percent of the core mix, one or more normal weight aggregate filler in the amount of 5 to 50 weight percent of the core mix, and water in the amount of 5 to 20 weight percent of the core mix. The process further comprises passing the core mix under a screed roller to flatten the core mix to produce an extruding board with a desired thickness.

In at least one embodiment of the present disclosure, a process for the formation of highly durable cementitious board using lightweight aggregate comprises pouring a core mix onto a conveyor, wherein the core mix is comprised of one or more lightweight aggregate filler in the amount of 0.5 to 5 weight percent of the core mix, passing the core mix under a screed roller to flatten the core mix to produce an extruding board with a desired thickness, wherein a forming wire is adjacent to the screed roller at the desired thickness such that it prevents accumulation of the core mix on the screed roller.

In at least one embodiment of the present disclosure, a process for the formation of highly durable cementitious board using lightweight aggregate comprises pouring a core mix onto a conveyor, wherein the core mix is comprised of, one or more lightweight aggregate filler in the amount of 0.5 to 5 weight percent of the core mix, one or more binders in the amount of 35 to 75 weight percent of the core mix, rheological admixture in the amount of about 0.5 to 5 weight percent of the core mix, surfactant in the amount of 0 to 0.1 weight percent of the core mix, one or more normal weight aggregate filler in the amount of 5 to 50 weight percent of the core mix, and water in the amount of 5 to 20 weight percent of the core mix. In such an embodiment, the process further comprises passing the core mix under a screed roller to flatten the core mix to produce an extruding board with a desired thickness, wherein a rotating rod is adjacent to the screed roller at the desired thickness such that it prevents accumulation of the core mix on the screed roller by rolling with the screed roller.

BRIEF DESCRIPTION OF THE DRAWINGS

Embodiments of the invention will now be described by way of example with reference to the accompanying drawings.

Figure 1:
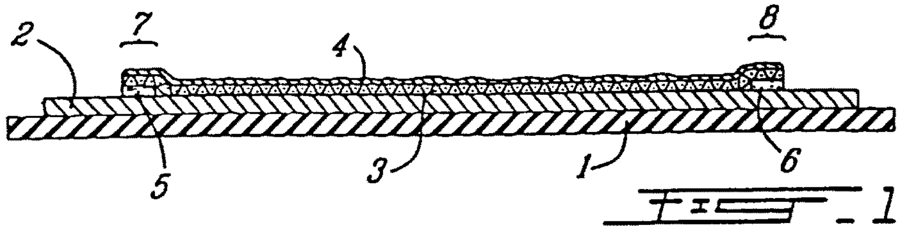
FIGS. 1 to 4 illustrate in schematic cross sectional views steps in the formation of an example panel in accordance with the present invention.

The invention will hereinafter be described in more detail in relation to the drawings by way of example only, in terms of a panel (e.g. wallboard) having a cementitious core comprising a hydraulic cement and aggregate of a light-weight type. The drawings are schematic in nature, are not drawn to scale and in some cases elements are exaggerated for purpose of illustration only.

DETAILED DESCRIPTION

In at least one embodiment of the present disclosure, the first and second edge strip members of a U-shaped edge reinforcing mesh may be adhered to a cementitious board core at respective marginal areas of a respective longitudinal marginal edge by being cemented thereto or as desired by being embedded in respective broad faces. A bridging member may as desired also be cemented to or as desired be embedded in a respective longitudinal edge face. On the other hand a bridging member need not if desired be adhered to a respective longitudinal edge face but may merely abut such face or as desired be spaced apart therefrom; in this latter case the bridging member may be water impervious such that, for example, cementitious material may not pass into or through the bridging member during the manufacture of a panel such that it is possible to for example provide the exposed side of the bridging member with a desired indicia as described above.

A cementitious board or panel of the present invention may be designed to be used as a backerboard for tile, thin brick, thin stones, architectural stone veneer, synthetic or natural stucco, paint, exterior insulation and finish systems or other finishes that can be applied onto concrete. It may be of interior or exterior grade and can be used in such places as kitchens, bath room, shower room, corridors, exterior wall, or any places that require water resistance and impact resistance. It may be used to construct fire resistant partition walls.

As may be understood, in accordance with the present invention a cementitious panel may have a composite or sandwich like construction wherein a cementitious core is bounded on each of its two major or broad faces by a respective reinforcing mesh or mat component of fibrous material; each reinforcing mesh or mat component being adhered to the panel core at a respective major face thereof.

The longitudinal edge faces of a panel may also be covered or closed off by an edge reinforcing mesh or mat component. The edge reinforcing mesh or mat component may be adhered to the longitudinal edge face, merely abut the longitudinal edge face or be spaced apart from the longitudinal face; this type of reinforcing mesh or mat component may, for example take on a U-shaped configuration as discussed herein. Alternatively, if desired, the longitudinal edge face or a part thereof may be open, i.e. not covered by a reinforcing mesh or mat material. In this latter case one or both of the marginal areas adjacent a longitudinal edge on opposite broad faces may be provided with an edge reinforcing member.

A panel in accordance with the present invention may have a longitudinal edge face which may be more or less free of cementitious material so as to allow the longitudinal edge face to be used as a support substrate for a visual indicia such as color, images, symbols, words, etc., i.e. the reinforcing mesh or mat may be configured such that an indicia support area would not be covered up during the manufacturing process by cementitious material.

The reinforcing mesh or mat components or members thereof whether for a broad or major face or for a longitudinal edge face may take the form of a woven or non-woven fabric or mesh such as a woven mesh or scrim, a non-woven mesh, a non-woven pervious mesh or mat, etc. Suitable fiber filaments may be formed into a woven material by the employment of a suitable method such as knitting or weaving. Suitable fiber filaments may be formed into non-woven material by the employment of a suitable method such as gluing or fusion.

The reinforcing mesh for a broad face may for example take the form of a woven mesh or a non-woven oriented mesh or mat. On the other hand a mesh for a longitudinal edge face may take the form of a non-woven mesh or mat, in particular a non-woven non-oriented mesh or mat.

A woven mesh or mat for a broad face may for example be composed of glass fibers and be in the form of woven or knitted fabric or scrim. When a glass fiber network is used in conjunction with an alkaline cementitious material, for example, a highly alkaline Portland cementitious composition, the glass fibers may be made from an alkaline resistant glass or have a protective coating so that damage which might result from reaction with the alkaline cementitious material, may be minimized or avoided; this may be accomplished by coating the fibers with an alkali resistant coating such as an epoxy or plastisol resin. The reinforcing mesh may, for example, be a fiber-glass scrim, in particular, a woven mesh of vinyl (e.g. polyvinylchloride) coated glass-fiber yarns.

The reinforcing mesh for a broad face may, if desired, alternatively, be in the form of a non-woven oriented fabric or web, bonded with a suitable synthetic resin or by heat. The mesh may be of non-woven oriented glass fiber tissue. A non-woven glass fiber tissue may be of resin-bonded fibers or filaments, for example fibers bonded with or without urea-formaldehyde and may have a weight of about 2 to 4 oz. per square yard. The fibers may for example have a diameter of 10 to 20 um.

However, a woven or non-woven oriented mesh of other materials may be used for reinforcing a broad face of a panel. Such a mesh may for example be of an inorganic material such as for example, of a metal (e.g. a steel fiber), of asbestos, of alumina, of zirconia, of carbon and the like. Alternatively, a mesh may be of synthetic material such as for example of organic polymeric fibers, for example, nylon fibers, polyvinylidene chloride fibers, polyester fiber yarns coated with PVC, aramid resin fibers (e.g. as sold under the trademark Kevlar), polyolefin fiber, e.g. polyethylene or polypropylene; of fluorinated polyolefin, e.g. polyvinylidene fluoride or polytetrafluoroethylene; or polyamide fiber; or of polyester fiber, e.g. poly(ethylene terephthalate); or of cellulosic fiber and the like.

The mesh size and the fiber diameter for a woven or non-woven oriented mesh used to reinforce the broad or major faces of the core may be selected according to the strength desired in the board and the size of the aggregate in the concrete mix. A mesh for a broad face reinforcement may, for example, have a relatively loose thread or mesh count per inch (warp×fill) such as for example, of from 4×4 to 18×18, of 10×8, etc. for most purposes.

In accordance with the present invention the reinforcement of the edges and margins of a cementitious board or panel may be accomplished by using a separate type of woven or non-woven mesh or mat fabric as compared with the reinforcing mesh used for the broad faces; advantageously, the reinforcing mesh for the edge face may be a non-woven non-oriented mesh. For example, a reinforcing mesh for the longitudinal edges may have relatively tight intercises as compared with a reinforcing mesh for a broad faces—2 to 4 oz. per sq. yd.—; the relatively tight intercises makes attachment of the board to a wall framework with nails or screws more secure, due to of a greater amount of mesh material per unit area than is present for the central portion of the major or broad faces of the panel.

The fibers in a non-woven mesh or mat for reinforcing a longitudinal marginal edge may be either randomly distributed or orientated. In the first case the longitudinal edges of the board will have substantially the same breaking strength in the longitudinal and the transverse directions. In the latter case, the longitudinal edges of the board can have high strength in the transverse direction but a lower strength in the longitudinal direction or vice versa. Thus, by varying the tissue characteristics, the edges may be made stronger in a particular direction, or additional strength can be provided in desired locations, e.g. along the board edges, by using tissues of appropriate fiber distribution.

The mesh size and the fiber diameter for a non-woven oriented mesh used to reinforce the longitudinal marginal edge face adjacent the longitudinal edge face may also be selected according to the strength desired in the longitudinal edge. However, a mesh for a longitudinal edge margin face may for example have a tighter weave or intercices than is used for the broad faces, i.e. for example a thread or mesh count tighter than 10×8. Thus the reinforcing meshes for the marginal edge faces may have relatively small openings such as for example meshes with a 16×10 count per inch may be used so as to secure the desired or necessary penetration of the fabric along the edge margins with the cementitious composition.

The nonwoven mesh for reinforcing a longitudinal marginal edge may for example comprise fleece-like mats or felts of fibers arranged in a non-oriented manner. The nonwoven non oriented mesh reinforcing material may be three dimensional in nature with the fibers thereof defining interconnecting voids. In general, the non-oriented mesh which may be employed in the reinforcement of the longitudinal marginal edges are generally those in which the voids are relatively small in size, i.e. the fibers in the mesh, mat or felt are relatively tightly packed, e.g. of 2 to 4 oz. Per square yard.

A mesh for reinforcing a longitudinal marginal edge may be of a material as described above for the mesh for reinforcing the broad face of a panel. Such a mesh may, for example be of a synthetic material (i.e. polymer) such as described above; it may in particular be of polypropylene or of a polyester. The fibers in the non-woven mesh, may be held in place by needle punching or, in the case of fibers derived from synthetic material such as an above describe polymer, by melt bonding or gluing (with a suitable adhesive) of the individual fibers to each other at points of intersection.

Illustrative of the non-woven spatial fabrics which can be employed in preparing the structures of the invention is a non-woven mat which is described herein below;

If desired the mat may be a mixture of two or more different types of fiber, or two or more mats of different fibrous material may be used.

The fibers in the mat may be multi-filament or monofilament.

It is preferred to use meshes that are flexible, and for this reason it is preferred to use relatively thin mats having a maximum thickness of the order of about 0.5 mm to 1 mm (e.g. up to 0.2 mm) and to use meshes made of relatively thin fibers, e.g. having a fiber diameter of no more than 1 mm in particular no more than 0.2 mm (i.e. 200 microns).

A reinforcing mesh whether for the broad faces or for the longitudinal marginal edges may be bonded to the core in any suitable fashion keeping in mind the reinforcing role that these meshes are to play. A reinforcing mesh may for example be bonded to a core by a cementitious slurry, for example, a portland cement slurry, or may be bonded by a cementitious component of a core mix extending through the openings in the mesh.

In accordance with the present invention a longitudinal edge face of a longitudinal marginal edge (i.e. a minor side face of a panel) need not be reinforced with or be covered with a reinforcing fabric. If, for example, a longitudinal edge margin is reinforced with a U-shaped reinforcement mesh component the bridge member thereof need not, if so desired, be adhered to the longitudinal edge face; on the other hand the bridge member may, if desired, be adhered to a longitudinal face as, for example, by an adhesive, by cementing or by being embedded in the core surface cement material. As may be appreciated from the above a bridge member links or connects a pair of arm members (i.e. edge strip members). These arm members are adhered to a marginal area of a respective broad face. However, such adherence need not be over the entire lateral width thereof. For example, a marginal area may comprise a grip region and an adhesion free region. The adhesion free region may border the longitudinal edge face. In this latter case an arm member may be adhered only to the grip region and not to the adhesion free region such that the cross section of the marginal edge may show that a U-shape surface including the surface of the longitudinal edge is not adhered to the U-shaped reinforcement mesh component, distal end portions only of the arm members are adhered to the marginal edge faces. Keeping in mind that the purpose of the U-shaped reinforcement mesh component is to reinforce the longitudinal edge of a panel the lateral width of a grip region is preferably larger (e.g. substantially larger) the lateral width of an adhesion free region bordering the longitudinal edge face.

The reinforcing mesh of the major faces and a mesh disposed about a longitudinal marginal edge faces may, for example, be held in place in the set product by allowing a cementitious composition to infiltrate intercices of such a mesh such that at least some of the fibers of the mesh may be embedded in the hardened cementitious composition. In this case in order to facilitate such penetration of a mesh by the cementitious composition, the fabrics should comprise a sufficient or desired degree of voidage so as to allow the unhardened cement composition to penetrate the mesh. In other words, a reinforcing mesh adhered to a broad face of a core and at least the portion of an edge reinforcing mesh adhered to a core along a marginal area thereof may be pervious meshes (i.e. pervious to cementitious slurry); the openings in a mesh, scrim or other fabric in this case are to be sufficiently large to permit passage of the mesh bonding material such as a Portland cement slurry, i.e. such that a mesh or scrim is cemented to or embedded in a face or surface.

In accordance with the present invention a cementitious panel may be produced employing a core mix alone or if desired by also employing a cementitious slurry.

By way of example only, a cementitious panel in accordance with the present invention, may be obtained by following the immediately herein below described steps. A first web of reinforcing mesh may first be provided for a core face which during manufacture forms part of the bottom layer of the panel and which is not as wide as the panel width. A marginal section or area of the first web on each side of the center may be disposed to overlap a portion of an edge reinforcing web or mesh of fabric leaving outer edge portions thereof uncovered thereby; the uncovered portion may be folded over to wrap each of the two edges of the core layer and also to extend over on to the top face of the core layer and overlap the upper broad face reinforcement mesh. A cementitious slurry may first be applied onto the first web so as to embed it therein and may be applied so as to leave uncovered at least an outer portion of the edge reinforcing webs for covering the longitudinally edge faces. The cementitious slurry may also be applied as to leave uncovered at least a center portion of the first web. The center section of the first web receives the core layer after the application of the slurry if used and it also may be laid down so as to leave exposed outer marginal portions of the web or mesh to be wrapped about the longitudinal edges. A second web of reinforcing fabric (which forms the top layer of the panel) which is preferably of the same width as the first web may be laid down on top of the core layer so as to overlay it and as desired or necessary is pushed just under the upper surface of the core so as to be embedded in the top surface. Bonding material such as a Portland cement slurry may also as desired or necessary is applied to the second web either before or after it is laid down on the core layer. The core layer may also act as a bonding material instead of a slurry, for the first web and/or the second web.

A cementitious slurry may for example comprise water and a cementitious material (i.e. a hydraulic cement as described above). A cementitious slurry, such as a Portland cement slurry, is strongly basic or alkaline having a pH of at least 11, due to the presence of calcium hydroxide, e.g. a pH of from 11 to 14, such as a pH of 11 to 13, e.g. a pH of 12.5 to 13. Such a slurry tends to react with, or have an affinity for, base-reactive surfaces and consequently have a decided tendency to cling, bindor react to these surfaces.

A core mix may for example comprise water, a cementitious material or binder (i.e. a hydraulic cement which is able to set on hydration such as for example, Portland cement, magnesia cement, alumina cement, a pozzolan such as fly ash or blast furnace slag, gypsum, and the like or a blend thereof), a normal weight aggregate, a lightweight aggregate, a chemical set admixtures, a rheological admixture, and one or more surfactants.

In at least one embodiment of the present disclosure, the normal weight aggregate within the core mix may be of a single use or a combination use of sand, stone, crushed stone, limestone, shale, clay, recycled concrete, granite or other minerals. In a preferred embodiment, the normal weight aggregate is composed of mortar grade sand. The particle size distribution of the normal weight aggregate may vary over a wide range e.g. up to about ⅓ (e.g. up ¼) of the thickness of the panel or smaller, such as for example from {fraction (1/32)} of an inch to ¼ of an inch.

In at least one embodiment of the present disclosure, the core mix is composed so as to comprise a chemical set control admixtures acting as a retarder or accelerator. In such an embodiment, the chemical set control admixtures may include, but are not limited to, lithium salts such as lithium carbonate, sodium tripolyphostate, Triethanolamine (TEA), calcium nitrite, sodium nitrite, calcium formiate, aluminum sulfate, sodium carbonate, calcium chloride, magnesium fluorosilicate, sodium sulfate, sodium silicate, calcium hydroxide, calcium-aluminate cement, calcium sulfate, calcium hydroxide, calcium nitrite, boric acid, borax, formic acid, citric acid, sodium citrate, sodium gluconate, glucose, sucrose, and fructose.

In at least one embodiment of the present disclosure, the core mix is composed so as to comprise a lightweight mineral and/or non-mineral (e.g. organic) aggregate(s) (e.g. sand, expanded clay, expanded shale, expanded perlite, expanded vermiculite, expanded pumice, bottom ash, fly ash, expanded closed-cell glass beads, closed-cell polystyrene beads (expanded or not), polyurethane, blast furnace slag, ceramic hollow sphere, glass hollow sphere, plastic hollow sphere, geopolymer hollow sphere, fly ash hollow sphere, silicate hollow sphere and/or the like). Suitable lightweight aggregates, may for example in particular be cellular in nature; a suitable non-mineral lightweight aggregate is for example expanded closed-cell polystyrene beads.

Aggregate for use in the cementitious core mix composition may be selected in accordance with the desired density of the finished panel. Aggregate may, for example, have a density of up to 120 pounds per cubic foot. For example, lightweight aggregates such as obtained from expanded forms of slag, clay, shale, slate, perlite, vermericulite and the like may produce panels having a density of from about 80 to about 115 pounds per cubic foot. On the other hand a material such as closed-cell glass beads or a plastic such as polystyrene beads may be used to obtain a panel having a density of from about 40 to 70 pounds per cubic foot or lower.

In at least one embodiment of the present disclosure, the core mix may contain rheological admixtures for water reduction or rheology modification. In such an embodiment, these rheological admixtures may be of a single use or a combination use of melamine sulfonate, sodium naphthalene sulfonate, lignosulfonates, cellulose polymer derivatives (i.e. HEC, HPMC, EC), hydrophobically modified alkali swellable emulsions or hydrophobically modified ethoxylate urethanes molecular rheology modifiers, Exopolysaccharide (i.e. Wellan gum, xantham gum), galactomannans (i.e. guar gum, carob gum), or other hydrocolloids. In a preferred embodiment, the rheological admixtures are sodium naphthalene sulfonate.

In at least one embodiment of the present disclosure, the core mix may compose natural or synthetic fibers which may be uniformly distributed through the core mix or layered within or one each side of it to provide reinforcement and core integrity. Such fibers may be of a single use or combination use of natural fibers such as cellulose, hemp, cotton, basalt, or synthetic fibers such as polyester, polypropylene, polyvinyl alcohol, nylon, alkali resistant glass, carbon, glass. In such an embodiment, the fibers may have a similar or different aspect ratio. In a preferred embodiment, the fibers are composed of polypropylene.

In at least one embodiment of the present disclosure, the core mix may include one or more surfactants added directly to the core mix or through foam generation. In such an embodiment, the surfactants may be made of blends of different chemicals having HLB values ranging from 5 to 25. In such an embodiment, the principal characteristic of the surfactants is to provide a relatively stable air bubble having walls of a certain strength, thereby ensuring the bubble stability at a high pH and high calcium content with strong mixing energy. One example of an appropriate surfactant is Alpha Olefin Sulfonates.

In at least one embodiment of the present disclosure, the proportions of the foregoing ingredients is such that the density of the resulting cementitious board is significantly lower than commonly used cementitious board and, ideally, lower than the density of water. An example of a set of acceptable and preferred range of ingredients is provided in the below table:

Acceptable and Preferred Range of Ingredients

| Ingredient | Acceptable Range (% w/w) | Preferred Range (% w/w) |
|---|---|---|
| Binders | 35 to 75 | 50 to 70 |
| Normal Weight Aggregates | 5 to 50 | 10 to 20 |
| Lightweight Aggregates | 0.5 to 5 | 0.5 to 3 |
| Chemical Set Admixtures | 1.5 to 10 | 2.5 to 9 |
| Rheological Admixtures | 0.5 to 5 | 0.5 to 1.75 |
| Surfactant | 0 to 0.1 | 0 to 0.01 |
| Water | 5 to 20 | 10 to 20 |

In at least one embodiment of the present disclosure, the ratio of water to binder in the core mix may range from 0.1 to 0.4, with an ideal ratio of the range falling between 0.15 and 0.30. It should be appreciated that the ratio of water to binders has a great effect on core mix rheology. Additional water added to the core mix reduces viscosity which increases the likelihood of segregation between the lightest components, such as, for example, the lightweight aggregates, and the heavier components, such as, for example, the binders and normal weight aggregate, during manufacture of the cementitious board. To avoid such segregation, an ideal range of 0.15 to 0.30 is recommended to preserve a relatively smooth and uniform board surface while preventing lightweight aggregates from separating through mesh reinforcement openings.

The below table provides experimental data regarding the percent composition of various ingredients within a core mix and the resulting ability to embed the core mix with mesh reinforcement to create a cementitious board with great compressive strength:

| | Percent (w/w) | | |
|---|---|---|---|
| Ingredients | A | B | C |
| Binders | 42% | 48% | 63% |
| Normal Weight Aggregates | 39% | 31% | 13% |
| Lightweight Aggregates | 2% | 2% | 2% |
| Chemical Set Admixtures | 3% | 3% | 4% |
| Rheological Admixture | 1% | 1% | 1% |
| Surfactant | 0% | 0% | 0% |
| Water | 14% | 15% | 18% |

As shown above, three experiments were conducted to test the ability to embed a core mix with mesh reinforcement to create a cementitious board with great compressive strength. In these experiments, the percentage composition of various ingredients was altered between tests “A”, “B”, and “C”. During test “A”, where the core mix was comprised of 42% binders and 39% normal weight aggregates, the mesh reinforcement was very difficult to embed within the core mix. In an attempt to improve this reinforcement, test “B” was conducted where the percentage of binders was increased to 48% in the core mix while decreasing the normal weight aggregates to 31%. Although this composition change of the core mix mildly improved the ability to embed mesh reinforcement, additional improvement was speculated. Accordingly, test “C” was conducted which increased the use of binders further to 63% of core mix composition while decreasing the normal weight aggregates composition to 13% and also increasing the chemical set admixtures to 4%. This modification to the core mix recipe dramatically improved the ability to embed mesh reinforcement to the core mix.

In at least one embodiment of the present disclosure, the ratio of lightweight aggregates to the total is 0.01 to 0.04, with an ideal ratio falling in a range between 0.015 to 0.025. In a preferred embodiment, the lightweight aggregate is comprised of expanded closed-cell polystyrene beads in order to achieve improved rheology which facilitates embedment of the cementitious board within the mesh reinforcement.

In at least one embodiment of the present disclosure, the lightweight aggregates are comprised of expanded closed-cell polystyrene beads which decreased diameter from those commonly used in the art. In such an embodiment, expanded closed-cell polystyrene beads with an expanded diameter falling in the range of 0.06 inches to 0.130 inches contribute to improved rheology while also increasing compressive strength of the core mix in comparison to expanded closed-cell polystyrene beads of a larger diameter. An example of a cross-sectional view of a cementitious board with small-diameter expanded closed-cell polystyrene beads is shown in FIG. 12*a*. As shown in FIG. 12*a*, one or more small-diameter expanded closed-cell polystyrene beads 500 are within the core mix.

In a preferred embodiment, the core mix comprises small-diameter expanded closed-cell polystyrene beads and larger-diameter expanded closed-cell polystyrene beads as lightweight aggregates. In such an embodiment, the inclusion of both small-diameter and large-diameter expanded closed-cell polystyrene beads provides a synergy that maximizes the compressive strength of resulting cementitious board. In a preferred embodiment, the quantity of large-diameter expanded closed-cell polystyrene beads versus small-diameter expanded closed-cell polystyrene beads is between 25% and 50%. An example of a cross-sectional view of a cementitious board with both small-diameter and large-diameter expanded closed-cell polystyrene beads is shown in FIG. 12*b*. As shown in FIG. 12*a*, one or more small-diameter expanded closed-cell polystyrene beads 500 and one or more large-diameter expanded closed-cell polystyrene beads 501 are within the core mix.

In at least one embodiment of the present disclosure, small-diameter expanded closed-cell polystyrene beads have an unexpanded diameter in the range of 0.015 inches to 0.028 inches. In a preferred embodiment, the unexpanded diameter is about 0.019 inches. In at least one embodiment of the present disclosure, small-diameter expanded closed-cell polystyrene beads have an expanded diameter in the range of 0.030 inches to 0.125 inches. In a preferred embodiment, small-diameter expanded closed-cell polystyrene beads have an expanded diameter of about 0.075 inches. In at least one embodiment of the present disclosure, the density of small-diameter expanded closed-cell polystyrene beads is about 1.1 to 1.4 pounds per cubic foot. In a preferred embodiment the density of small-diameter expanded closed-cell polystyrene beads is about 1.2 to 1.3 pounds per cubic foot.

In at least one embodiment of the present disclosure, large-diameter expanded closed-cell polystyrene beads have an expanded diameter in the range of 0.060 inches to 0.130 inches. In a preferred embodiment, the expanded diameter of large-diameter expanded closed-cell polystyrene beads is about 0.120 inches.

Experiments were conducted to arrive at the foregoing preferred percentage of large-diameter expanded closed-cell polystyrene beads versus small-diameter expanded closed-cell polystyrene beads to find the greatest compressive strength of resulting cementitious board from a core mix containing various percentages. The following table represents measured ASTM C109 cube compressive strength (psi) in resulting cementitious boards from core mixes over various percentages of large-diameter expanded closed-cell polystyrene beads versus small-diameter expanded closed-cell polystyrene beads:

| Percent of Large-Diameter EPS Versus Small-Diameter EPS | ASTM C109 Cube Compressive Strength (psi) |
|---|---|
| 0 | 856 |
| 25% | 1018 |
| 50% | 1014 |
| 75% | 765 |
| 100% | 595 |

As shown in the above table, experimental data revealed that a combination of small-diameter expanded closed-cell polystyrene beads and large-diameter expanded closed-cell polystyrene beads used as a light aggregate within a core mix provides the greatest resulting compressive strength for cementitious board. In a preferred embodiment, therefore, the range of a percentage of large-diameter expanded closed-cell polystyrene beads versus small-diameter expanded closed-cell polystyrene beads used as light aggregate ingredients within a core mix is between 25% and 50%.

It should be appreciated that the use of lightweight aggregates within a core mix produces unexpected results outside of the ability to maintain high durability and low permeability with a reduced overall weight of resulting cementitious board. In one instance, the use of lightweight aggregates, and more specifically small-diameter expanded closed-cell polystyrene beads, improves the ability to make a clean cut with a utility knife or other cutting apparatus of the cementitious board as compared to normal weight boards or competitively situated products.

It should be appreciated that one reason a lightweight board is easier to cut is due to the location of reinforcement mesh such that it may be visible but not delaminate from the core of a cementitious board when cut with a utility knife or other cutting apparatus. It should further be appreciated that a lightweight board using lightweight aggregates of a small diameter and spherical nature with a relatively uniform distribution will allow a clean cut to a cementitious board. It should further be appreciated that the relatively small amount of normal weight aggregate compared to a normal weight board improves the ability to make a clean cut. It should further be appreciated that the board being free of aggregates or fillers that are non-uniform in shape and/or of a relatively large nature (i.e. such as expanded clay, shale or perlite, diameter or length of ⅛ inch or more) enables a cleaner cut to be made. The lightweight aggregates possess a relatively weak bond between them as compared to normal-weight aggregates such that the weaker bonds are easy to shear. It should be appreciated, then, that a cementitious board using lightweight aggregates and a small amount of normal weight aggregate is more homogeneous than if it would contain non-uniform and/or larger aggregates, thereby enabling a cleaner cut to be performed.

In another instance of unexpected results, the use of small-diameter lightweight aggregates within a core mix improves fire performance of a resulting cementitious board as compared to normal weight board. In at least one test, the fire performance of a cementitious board with lightweight aggregates produces a fire performance of 5.2 minutes more than a target duration of 60 minutes.

In at least one embodiment of the present disclosure, a reinforcing mesh is adhered to the face of a panel. It is possible in accordance with the present invention for example to embed a mesh in a broad or narrow face of the core such that the mesh is disposed at or near the surface of the board so as to enhance the strength of the board or panel, i.e. the strength of the panel is enhanced if a mesh is adhered at a core face. The embedment of the reinforcing fibers just beneath the surfaces of the core may for example be carried out at a depth of submersion of mesh from for example about 0.019" (0.5 mm) to about 0.079" (2.0 mm) or less, e.g. 0.019" (0.5 mm) or less.

The core mix may be applied in any desired thickness, for example of values so as to be able to obtain a panel having the standard thicknesses of wallboard. A panel may be produced in varying thickness depending upon end use: e.g. in thicknesses of ¼", ⅜", 7/16", ½", ⅝, ¾", 1" etc.

In accordance with the present invention a cementitious core mix composition may be used which when cured has cells present due to entrained or entrapped air. Accordingly, a core mix may for example include or comprise a suitable air entrainment or foaming agent in such amounts so as to produce the desired or necessary degree of air entrainment.

As mentioned above the initial side edge meshes and first broad face mesh may be laid down on a suitable carrier support web; the carrier support web may for example advantageously be of a non-stick material relative to the cementitious material, i.e. the carrier on which the board is formed may be of a material to which the cementitious slurry does not readily adhere, example material are polyethylene or polypropylene film, 1.0 to 5.0 mils thick, polyethylene coated Kraft paper, 30 lbs. to 100 lbs. of strength.

As mentioned above, however, it may be desired to provide an edge face mesh which is not adhered to the edge face so as to avoid having the cementitious composition covering up a desired indicia which is to appear on the side edge of a panel. This may be achieved for example by providing the above mentioned edge reinforcing web with an at least substantially water impervious outer surface opposite the edge face or with a fiber or filament structure which may filter out any solids at the surface thereof so as to inhibit a mechanical bond on setting of the cementitious material.

The edges reinforcements may, for example extend inwardly from a longitudinal edge face approximately 0.5" to 2.5".

A panel in accordance with the present invention may thus comprise relatively thin surface reinforcement elements on the faces thereof so as to provide the panel with a relatively high strength. The panel may also have a core which is relatively readily penetrable by nails, screws and other fasteners. A panel may be obtained wherein the surface edge reinforcement layers are relatively strong and hard such that a nail or screw may be driven through the edge of panel without pre-drilling and without breaking, even when nailed or screwed almost at the very limit of the edge of the panel.

FIGS. 1 to 4 illustrate in a series of cross-sectional views a sequence of steps in a method for the manufacture of an example edge reinforced panel in accordance with the present invention wherein the longitudinal edge faces are not closed off. In these figures the reference numeral 1 indicate a conveyor belt, i.e. a support member and the reference numeral 2 indicates a protective film which is supported and advanced by the conveyor belt 1. The protective film 2 is wider than the panel to be made.

Referring now to FIG. 1, a web of a first non-woven oriented glass mesh 3 is shown with a previously applied Portland cement slurry 4 deposited thereon across its breadth in a layer. The first non-woven oriented glass mesh 3 has also previously been laid on the protective film 2 such that it overlaps a pair of first bands 5 and 6 of polypropylene non-oriented mesh which were previously laid on the protective film 2 in parallel spaced apart relationship, the first bands 5 and 6 being disposed along margin sections 7 and 8. As may be seen the margin sections 7 and 8 are covered by the first non-woven oriented glass mesh 3 and by the slurry 4 such that both the first non-woven oriented glass mesh 3 and the first bands 5 and 6 are slurried.

Figure 2:
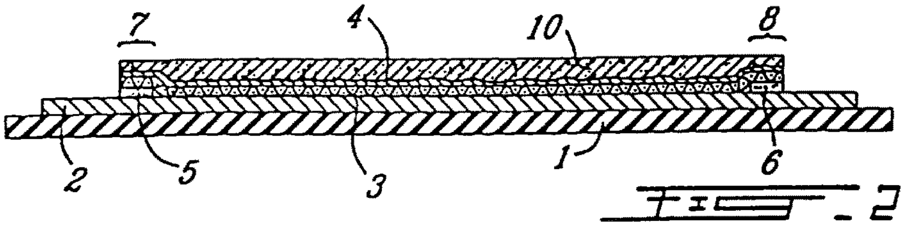

In FIG. 2 a core mix 10 is shown as having been laid upon the slurried first non-woven oriented glass mesh 3 so as to be deposited across the breadth thereof in a layer.

Figure 3:
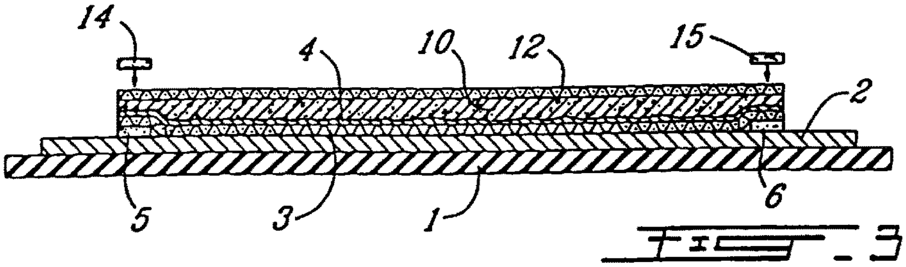

In FIG. 3 a second non-woven oriented glass mesh 12 is shown as having been laid upon the upper surface of the core mix 10 across the breadth thereof. This second non-woven oriented glass mesh was laid down under the urging or influence of a vibrating urging means which urged the second non-woven oriented glass mesh 12 into the upper surface of the core mix, i.e. so as to embed the second non-woven oriented glass mesh 12 in the top surface of the core mix 10.

In FIG. 3 an additional pair of second bands of polypropylene non-oriented mesh 14 and 15 are also shown in the process of being laid upon the second non-woven oriented glass mesh 12 in respective margin sections 7 and 8 opposite the previously laid down first bands 5 and 6. These second bands 14 and 15 are likewise laid down under the urging or influence of the vibrating urging means which urges these bands into the upper surface of the core mix on top of the second non-woven oriented glass mesh 12. The bottom of the core mix 10 is bonded to the mesh 3 by the slurry 4 or by the core mix itself.

Figure 4:
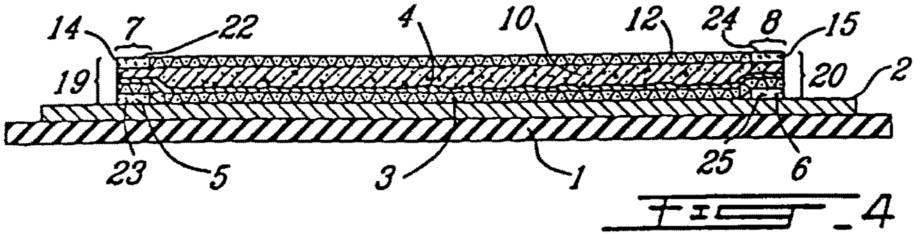

In this manner an edge reinforced panel is formed as shown in FIG. 4. The edge reinforced panel has a pair of opposed longitudinal edge faces 19 and 20. Each of the marginal sections 7 and 8 has a pair of marginal areas namely areas 22 and 23 and 24 and 25 which are associated with respective broad faces of the panel.

Figure 5:
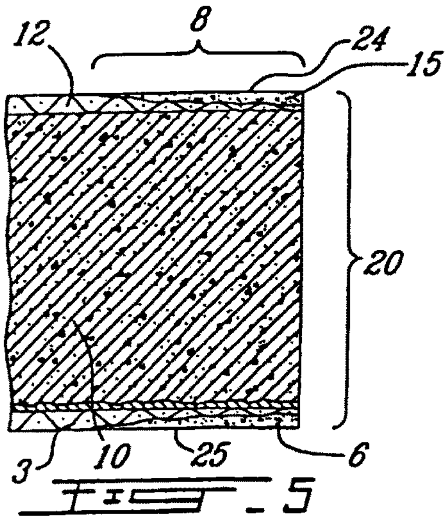
FIG. 5 is a schematic partial cross sectional view of a reinforced edge of a panel made in accordance with the steps illustrated in FIGS. 1 to 4.

FIG. 5 shows a schematic partial cross sectional view of a reinforced edge of a panel made in accordance with the steps illustrated in FIGS. 1 to 4. It shows for example the longitudinal edge face as not being closed off by for example a mesh bridging member connecting respective first and second bands as shall be discussed with respect to the FIGS.

7 to 12. In this case as may be appreciated the longitudinal edge faces of the core are exposed. As may be appreciated from FIG. 5 a longitudinal edge face and a respective pair of marginal areas 24 and 25 defines a longitudinal marginal edge; similarly for the other opposed side of the panel.

Figure 6:
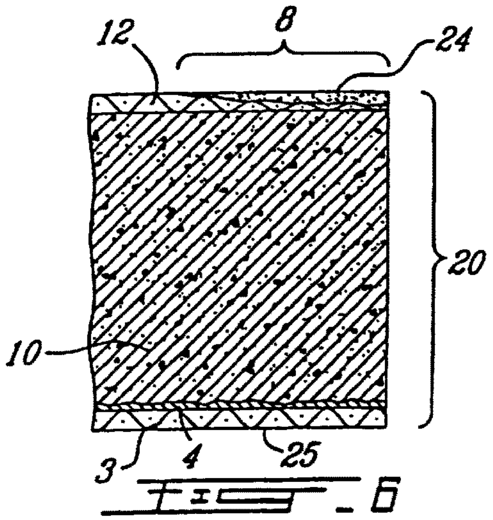
FIG. 6 is a schematic partial cross sectional view of a reinforced edge of another example panel made in accordance with the present invention wherein only one broad side face includes reinforcing mesh at the marginal edge area thereof.

FIG. 6 shows a schematic partial cross sectional view of a reinforced edge of a further panel made in accordance with the steps illustrated in FIGS. 1 to 4 except that the first bands have been omitted from the procedure such that the panel only has edge reinforcements due to the second bands; accordingly the same reference numerals have been used to designate common elements. It too shows the longitudinal edge face as not being closed off by for example a mesh bridging member such that the longitudinal edge faces of the core are exposed.

FIGS. 7 to 11 illustrate in a series of cross-sectional views a sequence of steps in a method for the manufacture of another example edge reinforced panel in accordance with the present invention wherein the longitudinal edge faces are closed off. In these figures the same reference numerals are used to designate elements common with those shown in FIGS. 1 to 6.

Figure 7:
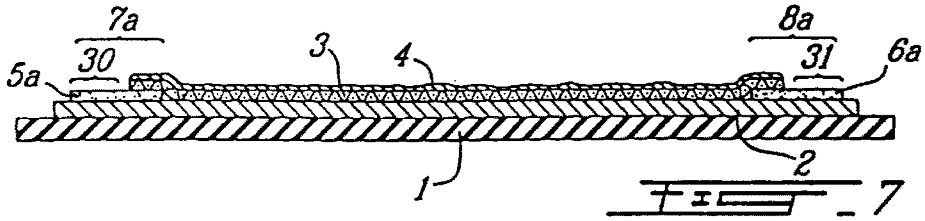
FIGS. 7 to 11 illustrate in schematic cross sectional views steps in the formation of another example panel in accordance with the present invention having a U-shaped edge reinforcing mesh.

In FIG. 7 a web of a first non-woven oriented glass mesh 3 is shown with a previously applied portland cement slurry 4 deposited thereon across its breadth in a layer. The first non-woven oriented glass mesh 3 has also previously been laid on the protective film 2 such that it overlaps a pair of wide bands 5 *a* and 6 *a* of polypropylene non-oriented mesh which were previously laid on the protective film 2 in parallel spaced apart relationship. The wide bands 5 *a* and 6 *a* are disposed along margin sections 7 *a* and 8 *a* and are only partially covered by the first non-woven oriented glass mesh 3. As may be seen the margin sections 7 *a* and 8 *a* are only partially covered by the first non-woven oriented glass mesh 3 and by the slurry 4 such that while the first non-woven oriented glass mesh 3 is totally slurried, the wide bands 5 *a* and 6 *a* are only partially slurried, i.e. outer portions 30 and 31 of the bands 5 *a* and 6 *a* are left unslurried. On the other hand, if so desired the slurry may be disposed so as not to cover at all the wide bands 5 *a* and 6 *a*.

Figure 8:
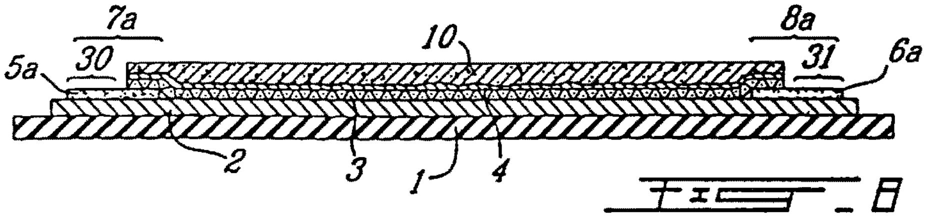

In FIG. 8 a core mix 10 is shown as having been laid upon the slurried first non-woven oriented glass mesh 4 so as to be deposited across the breadth thereof in a layer so as to again leave uncovered outer portions 30 and 31. Alternatively if so desired the slurry 4 may extend outwardly further over the wide bands 5 *a* and 6 *a* than the core mix 10 or vice versa. The slurry 4 may for example be extended outwardly further than the core mix in order to facilitate adherence (e.g. cementing) of the bands to the longitudinal edge face of the panel core or even the opposed broad face at a respective longitudinal marginal edge.

Figure 9:
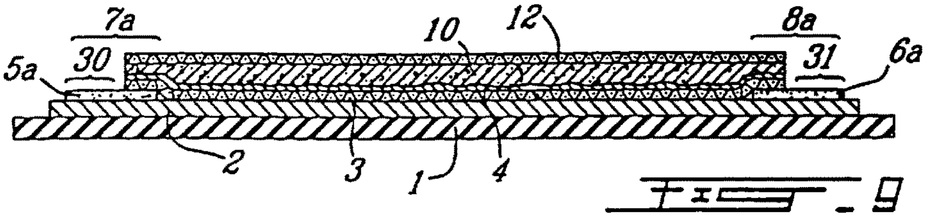

In FIG. 9 a second non-woven oriented glass mesh 12 is shown as having been laid upon the upper surface of the core mix 10 across the breadth thereof, again so as to leave uncovered outer portions 30 and 31. This second non-woven oriented glass mesh as before is laid down under the urging or influence of a vibrating urging means so as to embed the second non-woven oriented glass mesh 12 in the top surface of the core mix 10.

Figure 10:
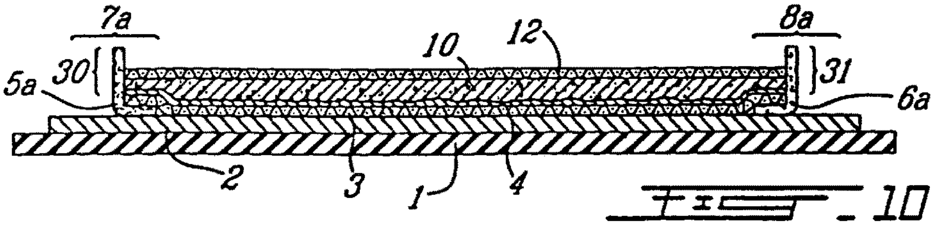

In FIG. 10 the two outer portions 30 and 31 of the wide bands 5 *a* and 6 *a* are folded upwards to an upright position by suitable guide means.

Figure 11:
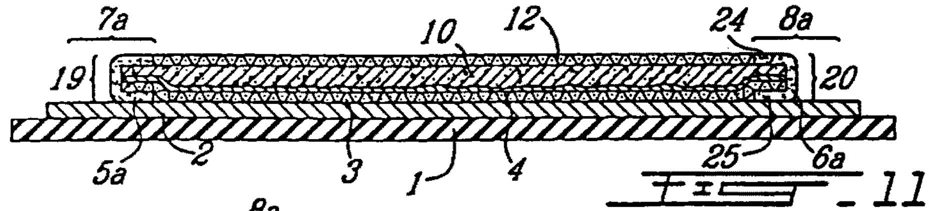

In FIG. 11 the outer portions 30 and 31 are bent or folded by suitable means over onto the second glass mesh 12 in respective margin sections 7 *a* and 8 *a* so as to form respective U-shaped edge reinforcing meshes adhered to the first and second meshes 3 and 12. The bent over outer portions 30 and 31 are likewise laid down under the urging or influence of the vibrating urging means which urges the distal ends of thereof into the upper surface of the core mix on top of the second non-woven oriented glass mesh 12.

In this manner an edge reinforced panel is formed as shown in FIG. 11. The edge reinforced panel has a pair of opposed longitudinal edge faces 19 and 20. Each of the marginal sections 7 and 8 has a pair of marginal areas namely areas 22 and 23 and 24 and 25 which are associated with respective broad faces of the panel.

Figure 12:
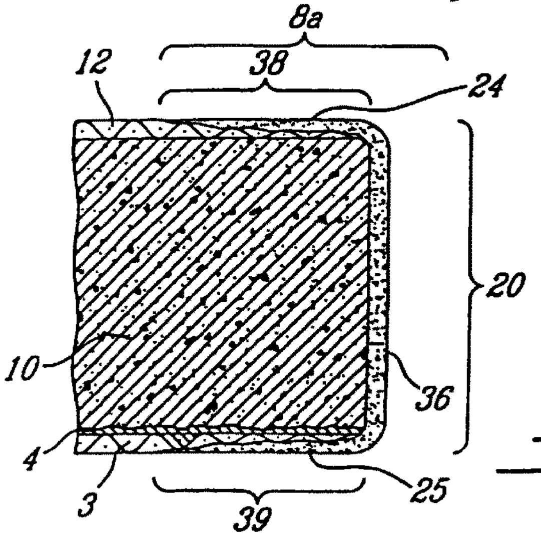
FIG. 12 is a schematic partial cross sectional view of a reinforced edge of a panel made in accordance with the steps illustrated in FIGS. 7 to 11.
Figure 12A:
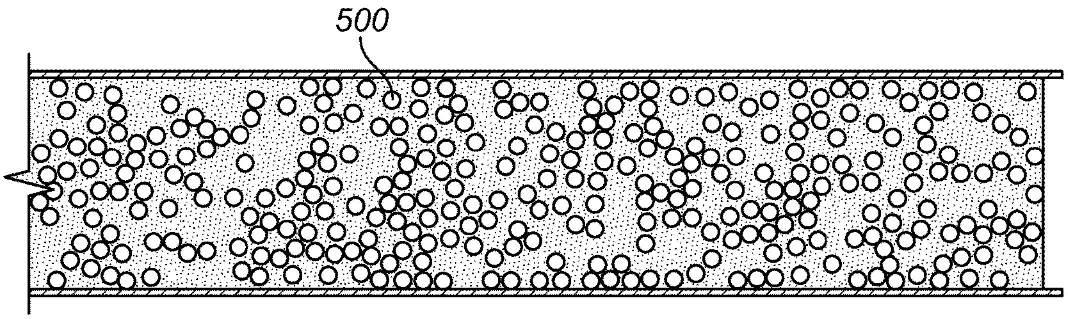
FIG. 12*a* is a schematic partial cross sectional view of a reinforced edge of a panel wherein the panel includes light weight aggregates of expanded closed-cell polystyrene beads.
Figure 12B:
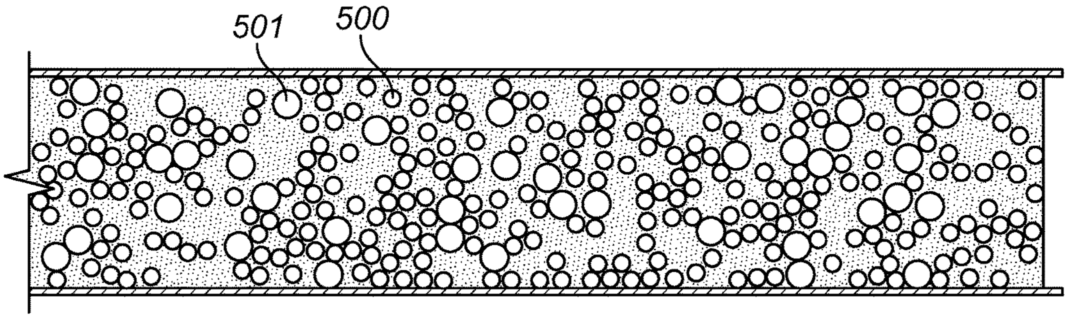
FIG. 12*b* is a schematic panel cross sectional view of a reinforced edge of a panel wherein the panel includes light weight aggregates of small-diameter expanded closed-cell polystyrene beads and large-diameter expanded closed-cell polystyrene beads.

FIG. 12 shows a schematic partial cross sectional view of a reinforced edge of a panel made in accordance with the steps illustrated in FIGS. 7 to 11. It shows for example the longitudinal edge face as being closed off by a mesh bridging member 36 of the U-shaped edge reinforcing mesh; this bridging member 36 connects respective first and second edge strip members 38 and 39. In this case as may be appreciated the bridging member may be adhered to the core mix due to infiltration of cementitious material into or through the structure of the bridging member. Also as may be appreciated from FIG. 12 a longitudinal edge face and a respective pair of marginal areas 24 and 25 defines a longitudinal marginal edge; similarly for the other opposed side of the panel.

As mentioned above an edge reinforced panel in accordance with the present invention may comprise a U-shaped edge reinforcing mesh wherein a bridging member need not be adhered to a respective longitudinal edge face but may merely abut such face or as desired be spaced apart therefrom; in this case the bridging member may for example be provided with a water impervious character such that cementitious material from the slurry of the core mix may not pass into or through the bridging member during the manufacture of a panel. It is possible for example to provide a wide band such as bands 5 *a* and 6 *a* with a preferably centrally disposed at least substantially water impervious longitudinally extending zone on the core side thereof. The zone may be provide by means of any mechanism which may render the central zone impervious, e.g. by applying a water tight tape, by applying a suitable paint, by applying a wax material etc., to the central zone. In such case it is possible, for example, to apply to the opposite exposed side of the bridging member a desired indicia in the form for example of a color, words, etc. Suitable materials are as follows: adhering tape: masking tape, translucid shipping tape, electric tape or other self-adhering tape; size: 0.5 to 4 inches wide, preferably 0.75 inch wide; made preferably of: polyethylene, paper, but can also be made of other impervious or semi-impervious material.

Material coatings: acrylic paint, oil paint, varnish, wax, silicone sealant, applied with roller or spray equipment on a width from 0.5 to 4 inches wide, preferably 0.75 inch wide. The coating can be impervious or semi-impervious. Material: non adhering film: 1 to 5 mils thick; 0.5 to 4 inches wide, preferably 0.75 inch wide; made preferably of: polypropylene, polyethylene, paper, but can also be made of other impervious or semi-impervious material.

Figure 13:
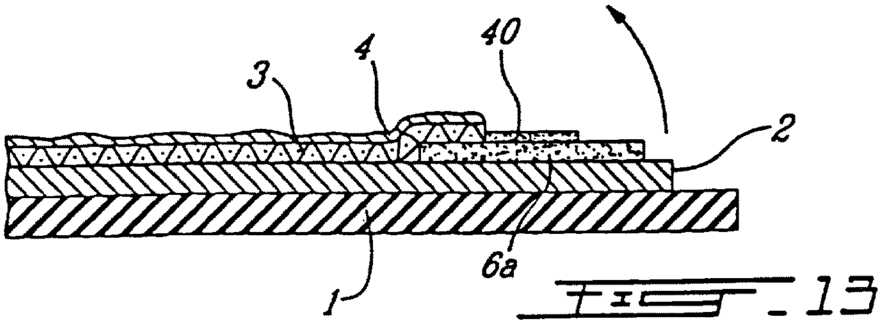
FIGS. 13 and 13*a* each illustrate in schematic partial cross sectional view a step in the formation of additional example panels in accordance with the present invention wherein the bridging member is not adhered to the core.

FIG. 13 shows a schematic partial cross sectional view similar to FIG. 7 but wherein the wide band 6 *a* is provided with a central longitudinally extending, at least substantially water pervious zone defined by an at least substantially water proof tape 40 which is attached (e.g. glued) to the core side of the band 6 *a*. A similar water proof tape may if desired also be applied to wide tape 5 *a*. As for the rest of the process as illustrated in FIGS. 7 to 11 are concerned they stay the same.

Figure 14:
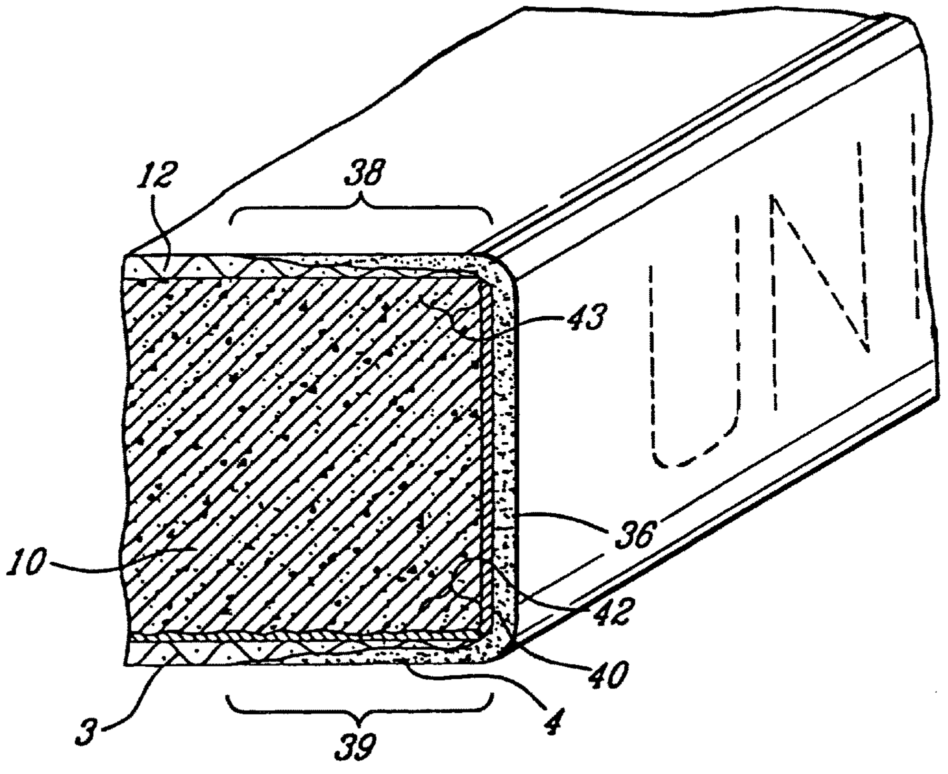
FIGS. 14 and 14*a* are each schematic partial cross sectional views of a reinforced edge of a panel made in accordance with a process respectively including the step illustrated in FIGS. 14 and 14*a;*

FIG. 14 shows a schematic partial cross sectional view of a reinforced edge of a further panel made in accordance with a process as shown in FIGS. 7 to 11 but with the modification shown in FIG. 13. As may be seen the panel differs from the panel illustrated in FIG. 12 in that the waterproof tape 40 abuts the longitudinal side edge of the core and is sandwiched between the core side edge face and the bridge member 36. The presence of the tape 40 during manufacture inhibits the bridge member from being adhered to the core, by way of cementation or embedding. Since the tape is at least substantially waterproof the outer exposed surface of the bridging member, which in this case is provided with lettering in dotted outline, is not covered with cementitious material and the lettering is exposed to view in the final panel product.

Figure 13A:
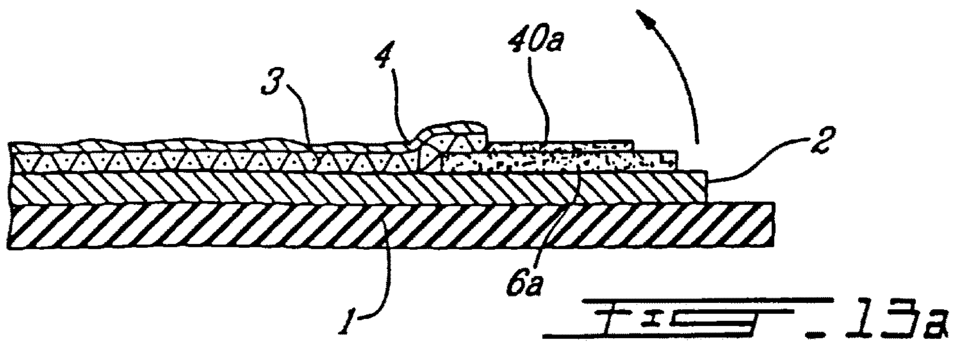
Figure 14A:
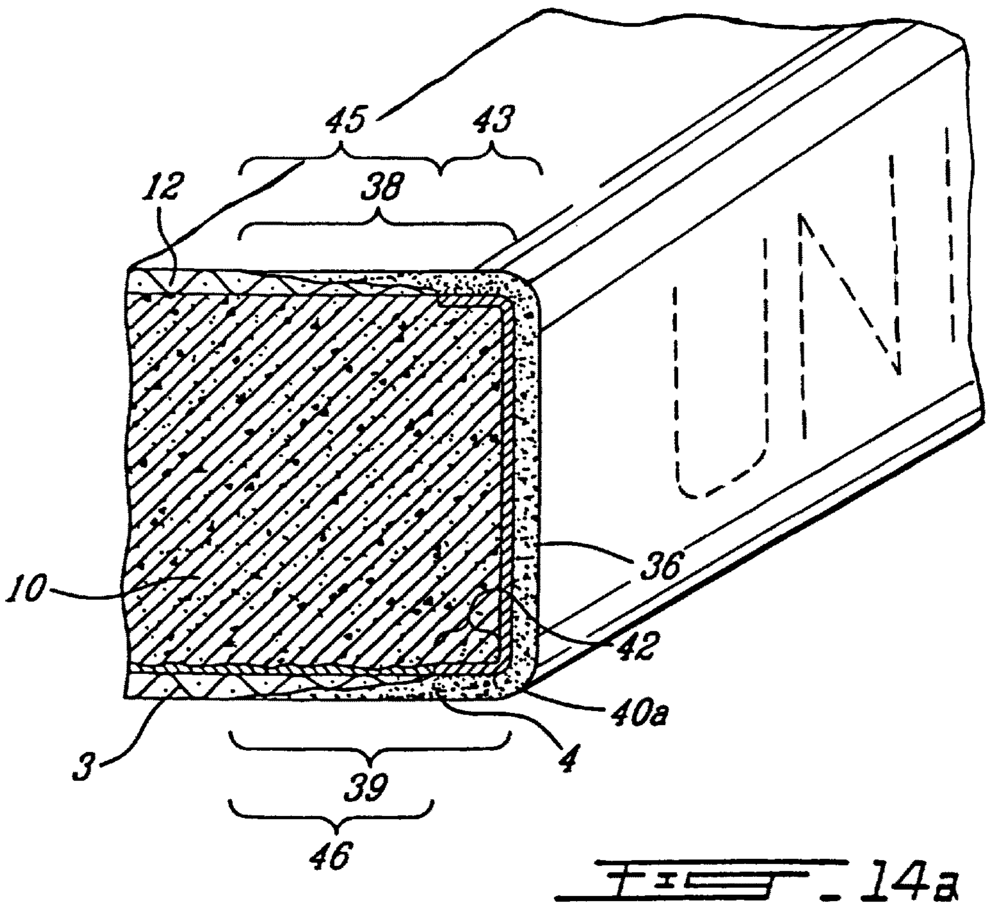

As may be seen from FIG. 14, the tape 40 more or less extends only across the breadth of the core side edge face. Alternatively, as desired or as necessary, a substantially water impervious tape may extend into one or both of the adjacent marginal areas of the broad faces. As mentioned above, a marginal area may have a grip region and an adhesion free region. Referring back to FIG. 14 examples of the position of such adhesive free regions are designated by the reference numerals 42 and 43; the grip regions occupy the rest of the marginal areas. If a panel is to have one or both adhesion free regions 42 and 43 then the above mentioned process for manufacturing described with respect to FIGS. 13 and 14 may for example be modified by using a wider water impervious tape. FIGS. 13*a* and 14 *a* relate to such a process for the provision of a panel having such adhesion free zones along both side edges thereof; in FIGS. 13*a* and 14 *a* the same reference numerals have been used as with respect to FIGS. 13 and 14 to designate common elements. In FIG. 13*a* the wider water impervious tape is designated by the reference numeral 40 *a*. As may be seen from FIG. 14*a*, the tape 40 *a* in the final panel configuration has a U-shape like cross section (if somewhat flattened); i.e. a U-shape surface including the surface of the longitudinal or side edge is not adhered to the U-shaped reinforcement mesh component, distal end portions only of the strip members are adhered to the marginal edge faces in the grip regions. For the configuration shown in FIG. 14*a* the distal part of the strip members is adhered to the core in the grip regions 45 and 46.

Figure 15:
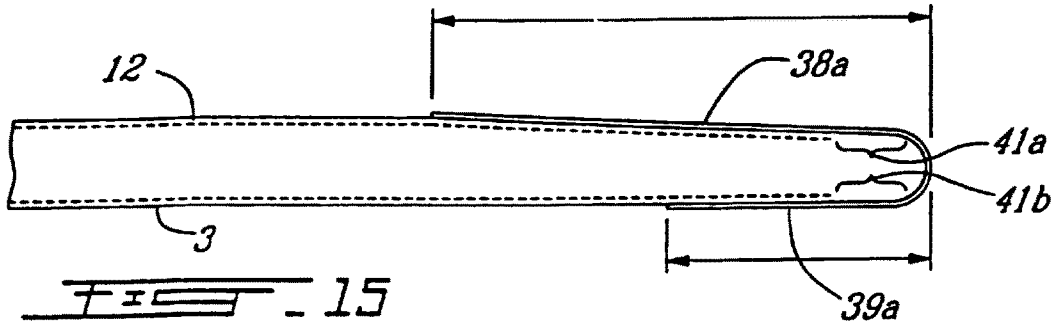
FIG. 15 is a schematic partial cross sectional view of the edge of another example panel in accordance with the present invention.
Figure 16:
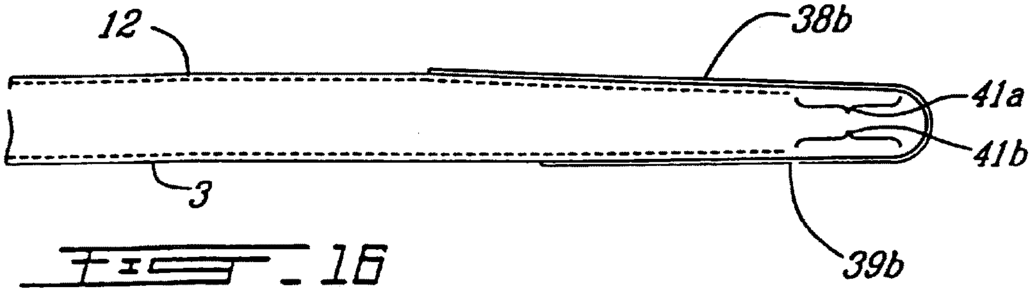
FIG. 16 is a schematic partial cross sectional view of the edge of a further example panel in accordance with the present invention.
Figure 17:
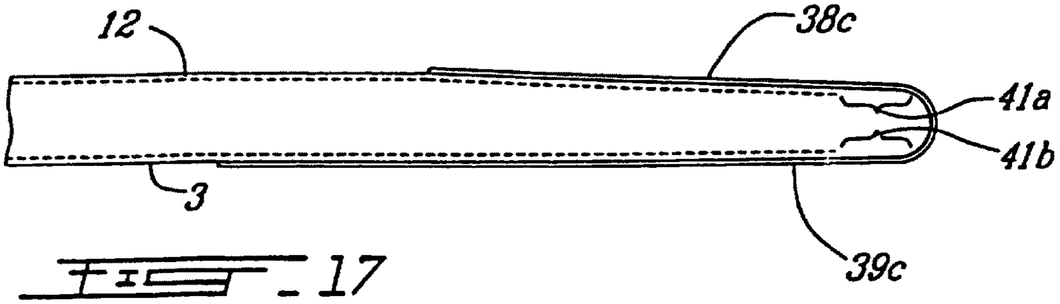
FIG. 17 is a schematic partial cross sectional view of the edge of yet another example panel in accordance with the present invention.

In FIGS. 7 to 14 *a* the first and second edge strip members 38 and 39 are more or less of equal length. In accordance with the present invention these strip members may as desired or necessary be of different length. The FIGS. 15 to 17 show schematic partial views of example panels in accordance with the present invention wherein the strip members are of different length. FIG. 15 shows a strip member 38 *a* which is longer than strip member 39 *a*; FIG. 16 shows a strip member 38 *b* which is somewhat longer than strip member 39 *b*; FIG. 17 shows a strip member 38 *c* which is shorter than strip member 39 *c*.

For purposes of illustration FIGS. 7 to 13 and 14 relate to panels wherein the reinforcement mesh for the broad faces more or less extend the full breadth of the broad face of a panel. However, in accordance with the present invention it is advantageous to have panels wherein the side edges of the reinforcement mesh for the broad faces do not extend the full breadth of the broad face of a panel but are somewhat offset from the panel edge such as may be seen in FIGS. 15, 16 and 17. The offset distance may for example be from ⅛ to ¼ of an inch. Other offset distance may also be used keeping in mind however that the edge reinforcement mesh are to still overlap the edges of the broad face meshes in the marginal areas of the broad faces. The offset regions are designated by the reference numerals 41*a* and 41*b* in FIGS. 15 to 16. In order to accommodate such offset regions the process steps discussed above with respect to FIGS. 7 to 13 and 14 may be modified for example by using broad face meshes which are still centered in place as shown in these figures but for which the width at each side edge is shorter by the above mentioned amounts (i.e. shortened by from ⅛ to ¼ of an inch); in this case the core mix would be laid down so as to extend beyond the broad mesh edges for example by the above mentioned offset distances.

Turning now to FIGS. 18 to 21, these figures illustrate an apparatus for the preparation of an example panel in accordance with the present invention exploiting an example method of manufacture also in accordance with the present invention.

Figure 18:
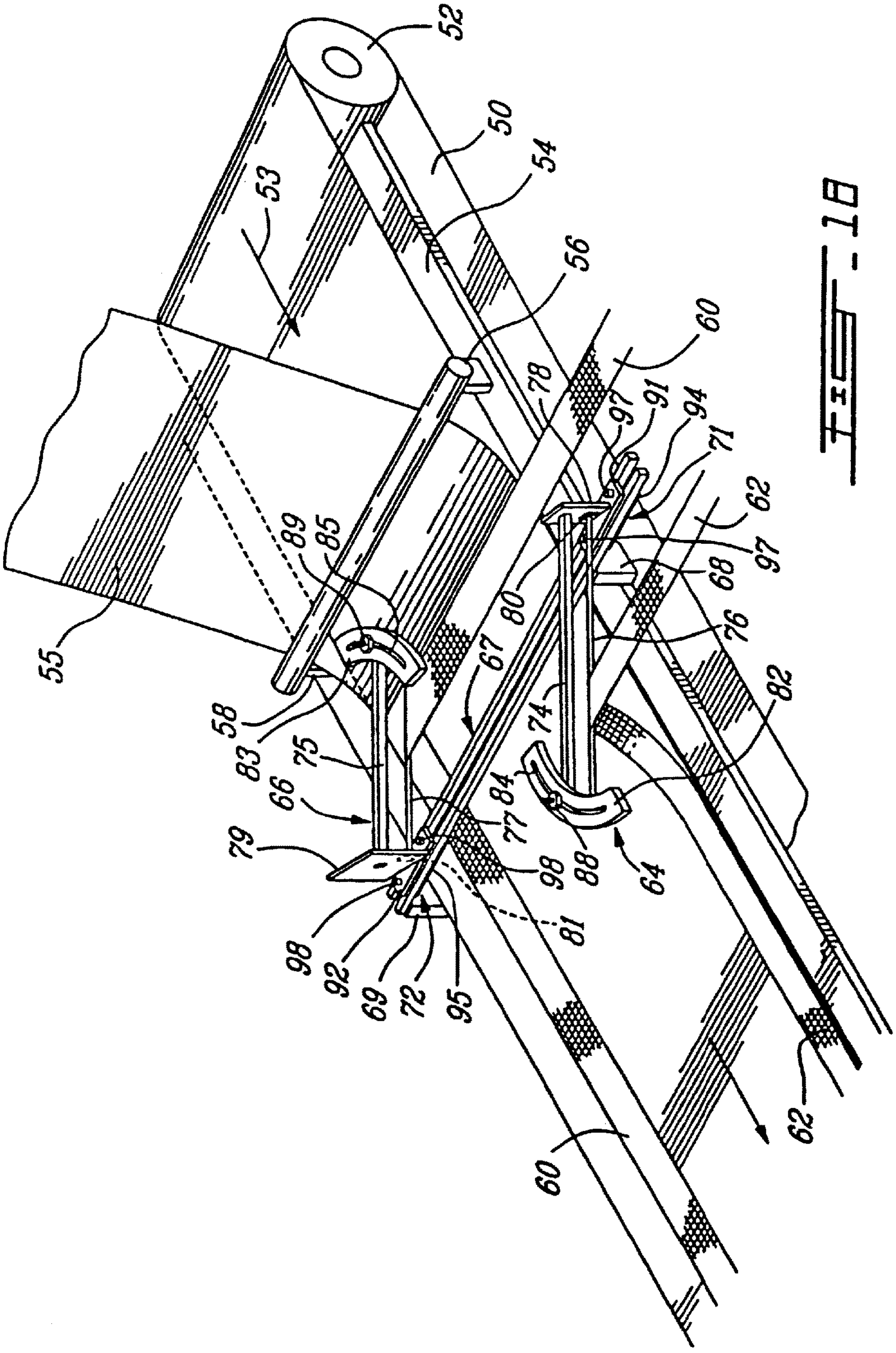
FIG. 18 is a partial schematic perspective view of the forward end of an apparatus in accordance with the present invention for making an edge reinforced panel in accordance with the present invention.
Figure 19:
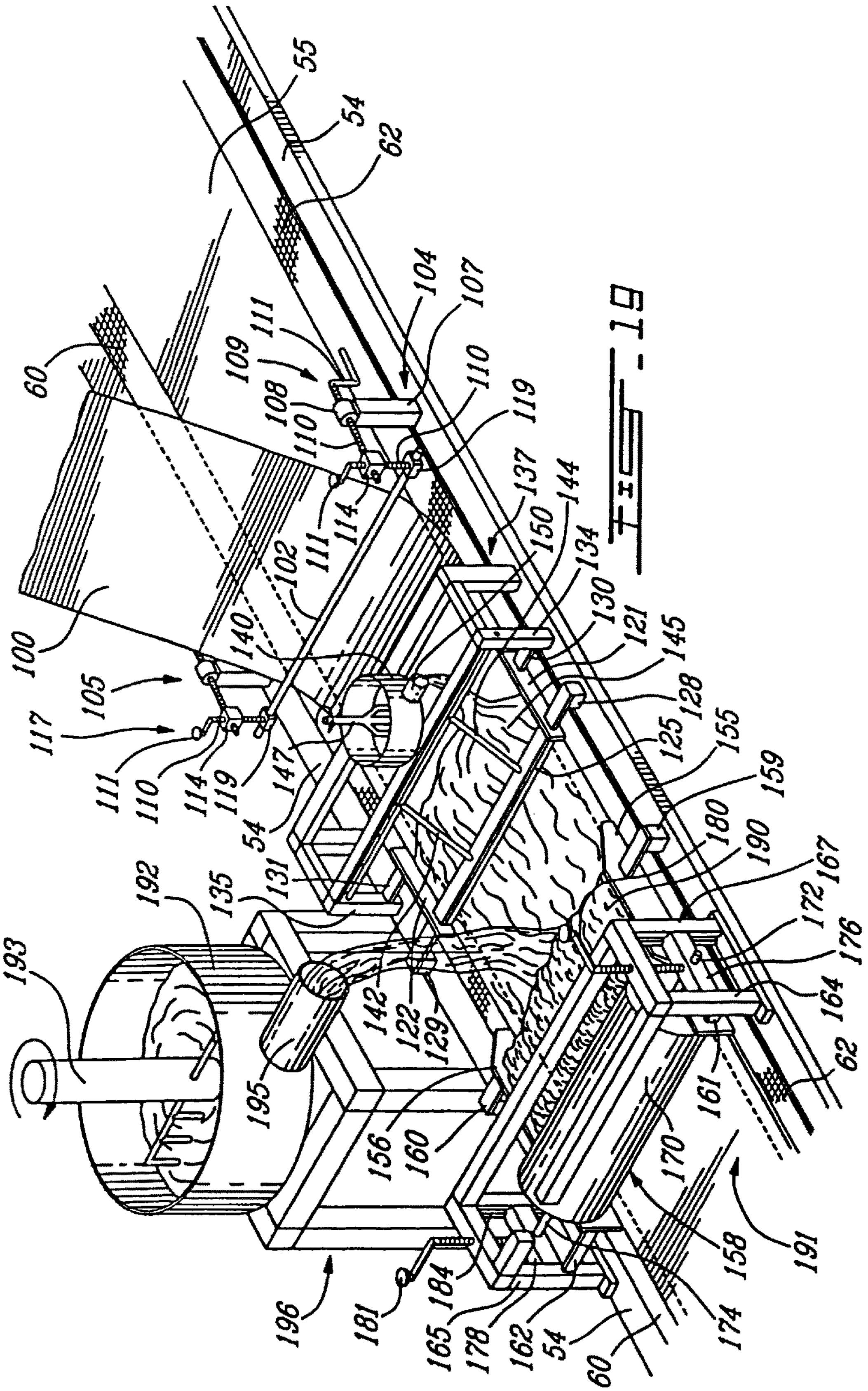
FIG. 19 is a partial schematic perspective view of the central part of the example apparatus for which the forward end is shown in FIG. 18.
Figure 20:
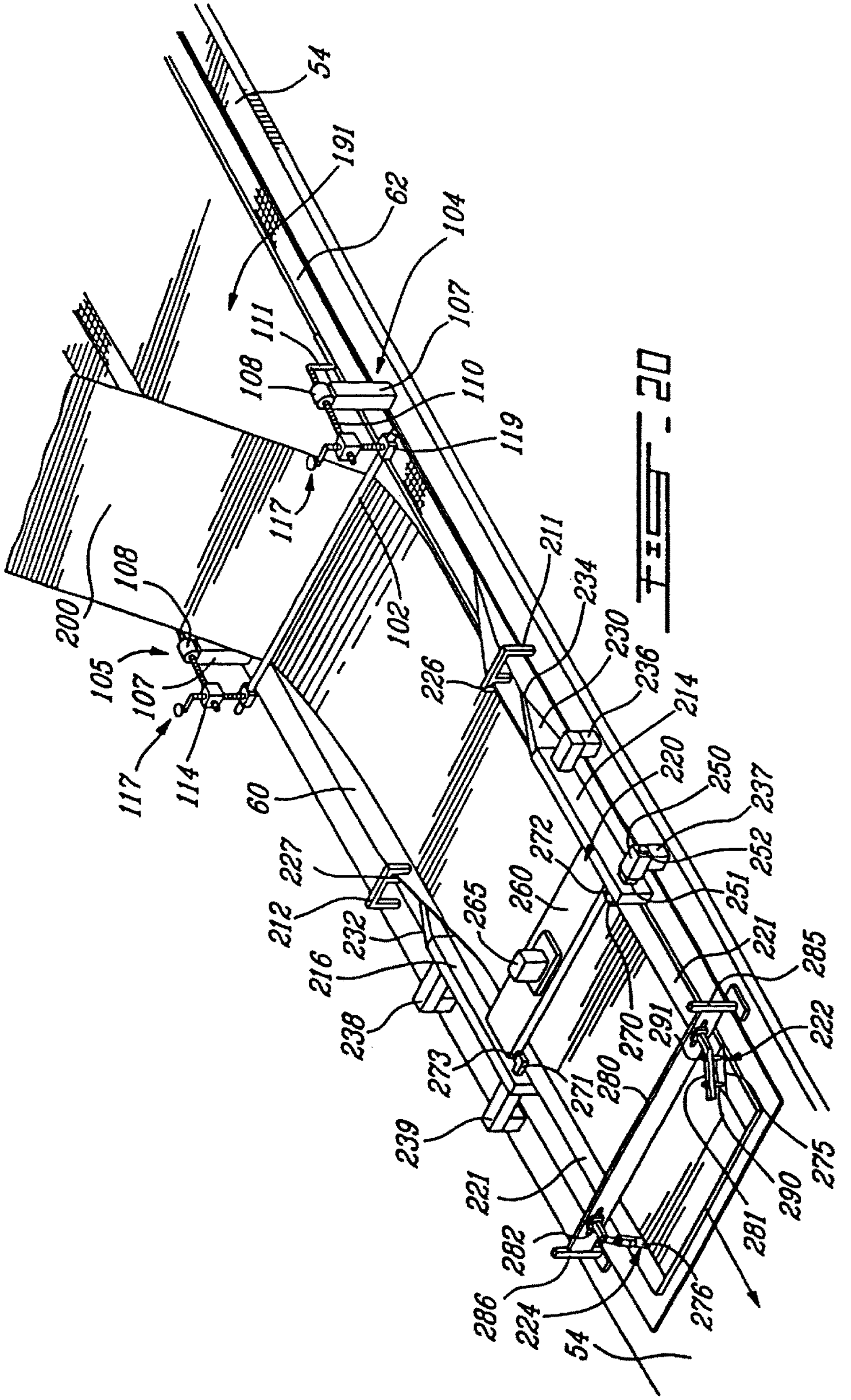
FIG. 20 is a partial schematic perspective view of the rear end of the example apparatus for which the forward end is shown in FIG. 18.
Figure 21:
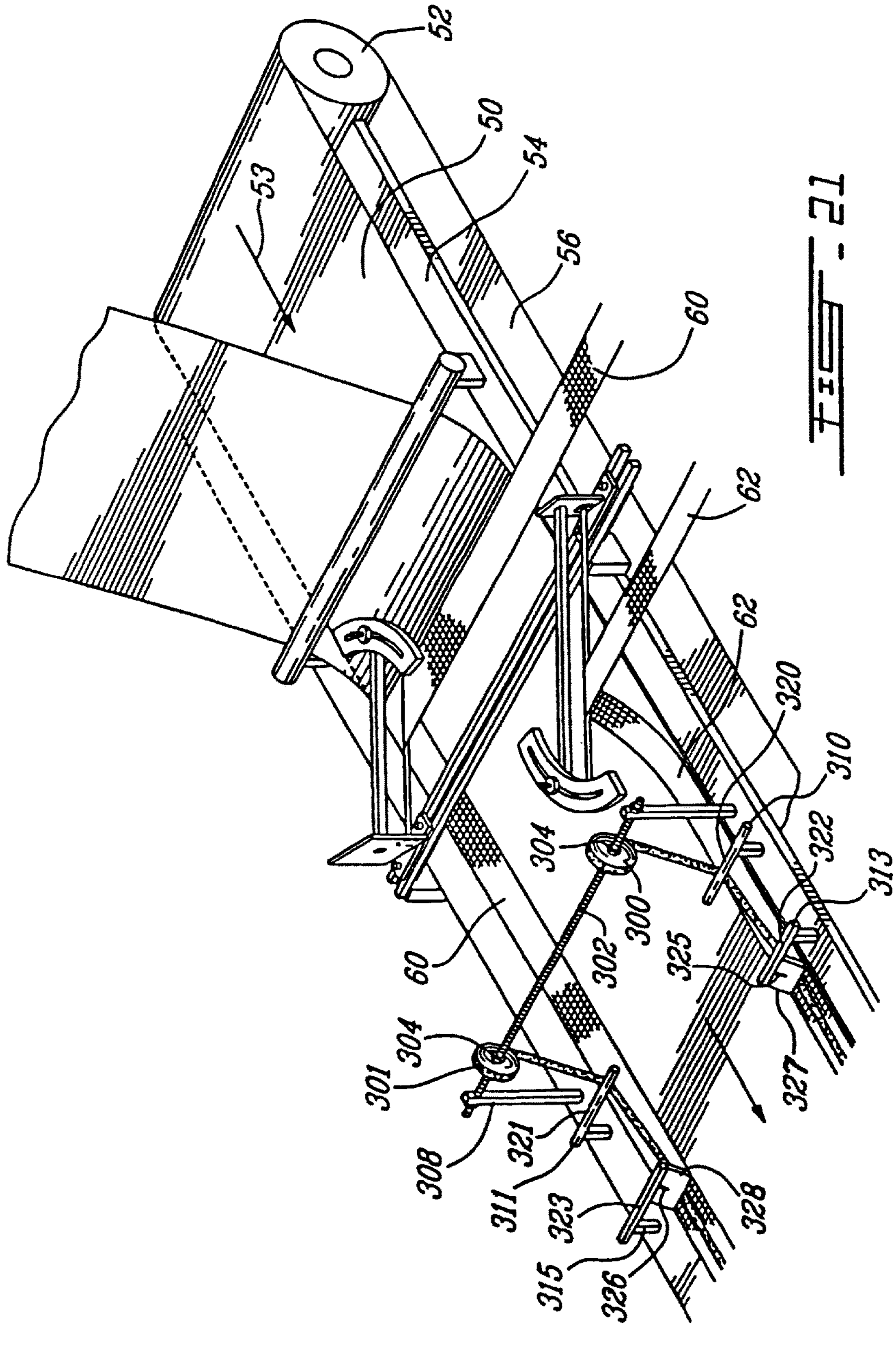
FIG. 21 is a partial schematic perspective view of the forward end of an apparatus in accordance with the present invention for making an edge reinforced panel in accordance with the present invention wherein the bridging member is not adhered to the core.
Figure 22:
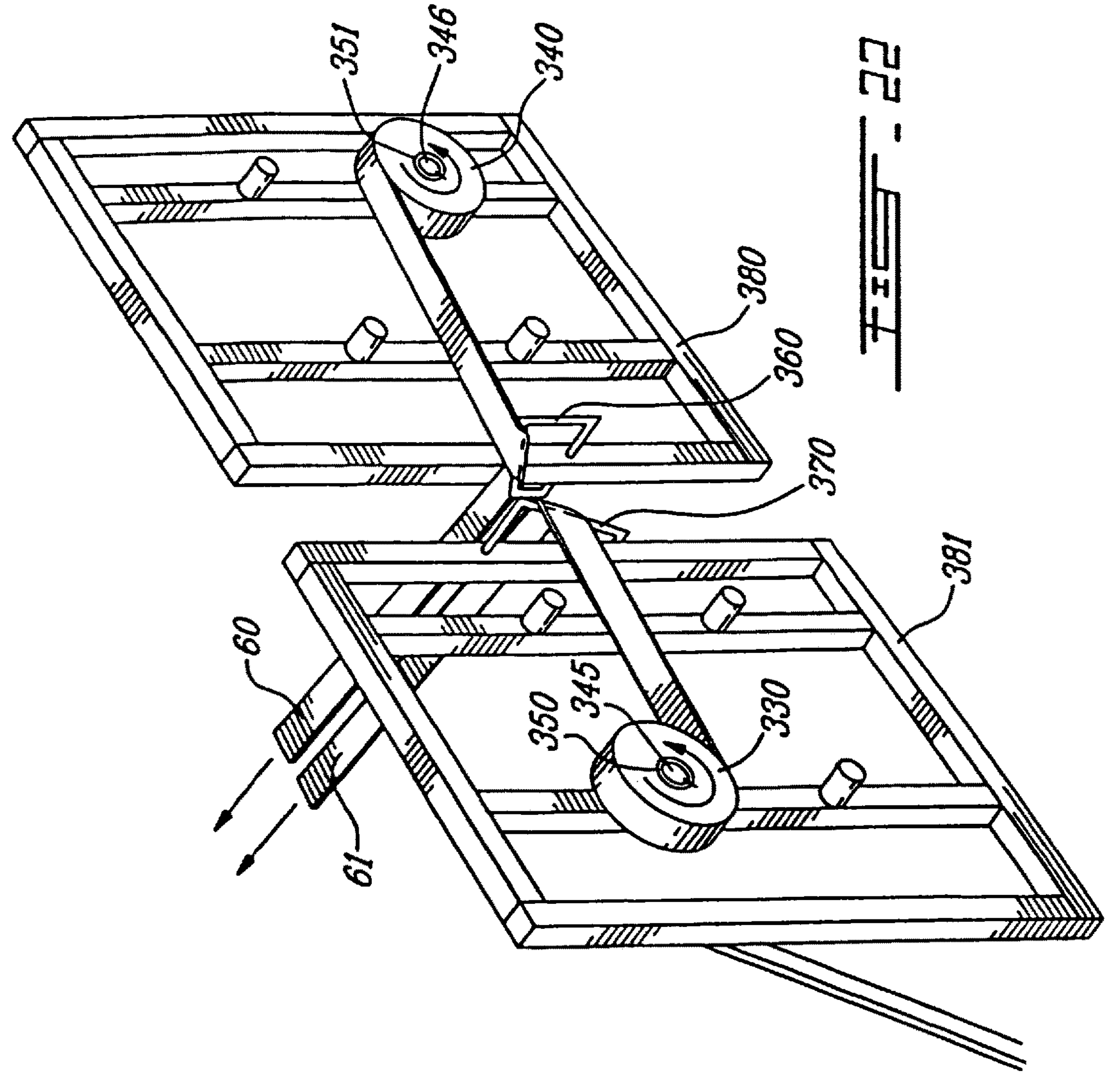
FIG. 22 is a partial schematic perspective view of an example strip feeding mechanism for feeding reinforcing strips to the forward end illustrated in FIG. 18.

FIG. 18 illustrates an upstream portion of the example apparatus; FIG. 19 illustrates a central portion of the example apparatus; FIG. 20 illustrates a downstream portion of the example apparatus; FIG. 21 illustrates an alternate upstream portion of the example apparatus which is similar to that shown in FIG. 18 but which includes a tape application zone; and FIG. 22 illustrates an upstream band feeding station for feeding a pair of side reinforcement band meshes to the apparatus upstream portion shown in FIG. 18.

Referring to FIG. 18, the apparatus has a conveyor system comprising an endless conveyor belt 50 as well as attendant drive and return rollers; return roller 52 is shown in FIG. 18; the drive roller (not shown) is located at the other end of the conveyor belt and is configured in any suitable manner so as to be able to induce movement of the belt such that it travels in a working direction as shown by the arrow. The apparatus also has a support or forming table 54. The conveyor system and the table 54 are arranged such that the conveyor belt 50 is able to slightingly travel over the surface of the table 54 such that the table is able to support the conveyor belt as well as any material disposed thereon.

The apparatus may include a protective film alignment component for alignment of an optional protective film 55 onto the conveyor belt. The protective film 55 is feed from a roll of such film (not shown). A protective film 55 is laid onto the belt so as to protect it and avoid the necessity of applying a release agent thereto. The film 55 should be wider than the board's width, for example wider by at least 5" to 7" or more. The protective film 55 may for example be made of polyethylene 1.0 to 5.0 mils in thickness.

The protective film alignment component comprises an alignment bar 56 as well as support members 57 and 58 which maintain the alignment bar 56 a predetermined distance above the conveyor belt 50. The alignment bar 56 is suitably fixed to the support members 57 and 58 (e.g. as by welding, bolting, etc.); the support members 57 and 58 are similarly fixed to the table 54.

Further downstream the apparatus has a side edge reinforcement deposit station for depositing a pair of spaced apart bands 60 and 62 of reinforcement mesh onto the protective film. The side edge reinforcement deposit station has pair of edge band alignment components 64 and 66 which are releasably slidable along a transverse rail element 67 fixed to side edges of the table by upright support members 68 and 69 such that the rail element 67 is suitably spaced above the conveyor belt. The rail element comprises two parallel spaced apart tracks. These band alignment components are configured so as to be positioned for depositing, onto the protective film, the two parallel bands 60 and 62 of reinforcement mesh in the appropriate marginal positions according to a panel's or board's desired width. The bands 60 and 62 may be of sufficient width (e.g. 4" to 5") so as to cover the upper and lower marginal edge areas (2" to 3" wide) and provide a 0.5" minimum overlap of the upper and lower broad face reinforcement meshes referred to below.

The bands 60 and 62 of reinforcement mesh may for example be made of a synthetic non-woven non-oriented material. These bands 60 and 62 may for example have a thickness of 0.010" to 0.020" and a density of 2 to 4 oz. per square yard. The bands 60 and 62 may for example be of polypropylene. The bands 60 and 62 may for example be in the form of a roll of a diameter of 20" to 50" but preferably 30", e.g. in order to give a length of approximately 500 to 1000 linear yards.

The band alignment components 64 and 66 each have a rail grip member respectively designated by the reference numbers 71 and 72 for gripping the rail element 67 so as to attach these components to the rail element 67 at a predetermined position thereon. Each band alignment component 64 and 66 comprises an upper support arm (respectively designated by the reference numbers 74 and 75) and a lower slide bar arm (respectively designated by the reference numbers 76 and 77) which are attached to an upright support plate (respectively designated by the reference numbers 78 and 79) which projects from each of the rail grip members 71 and 72 transversely to the longitudinal axis of the rail element 67. The upper support arms 74 and 75 project more or less at a right angle from a respective plate 78 or 79 to which they are fixed in any suitable fashion (e.g. by welding). The lower slide bar arms 76 and 77 are respectively pivotally attached to plate 78 and 79 by any suitable pivot means 80 and 81 (e.g. a hinge). The band alignment components each respectively have a crescent plate 82 and 83 fixed at the distal ends of upper support arms 74 and 75; these crescent plates 82 and 83 are each provided with an arc shaped alignment slot 84 or 85. The distal end of each of the lower slide bar arms 76 and 77 respectively has an upturned threaded end portion which extends upwardly at right angles to the rest of the slide bar arm through a respective slot 84 and 85. A respective tightening nut 88 or 89 is disposed on a respective threaded end portion above a respective plate 82 or 83. Just adjacent the underside of each plate 82 and 83 a respective upper end portion has a respective transversely projecting ridge member disposed such that as a respective nut 88 or 89 is screwed downwardly the ridge member can abut the underside of a respective plate 82 or 83 so as to clamp a respective lower slide bar arm 76 or 77 at a predetermined arc position. Loosening the nuts 88 or 89 allows the lower slide arm bar 76 or 77 to be pivoted about the pivot means 80 or 81 to a desired arc position.

Each of the rail grip members 71 and 72 is also configured so as to be able to releasably clamp a respective band alignment component 64 or 66 at a predetermined position on the rail element 67. The grip members 71 and 72 each have upper clamp plates (respectively designated by the reference numbers 91 and 92), lower clamp plates (respectively designated by the reference numbers 94 and 95) and a pair of releasable tightening bolts (respectively designated by the reference numbers 97 and 98). The upper clamp plates 91 and 92 are provided with unthreaded openings through which the shafts of the bolts 97 and 98 project. On the other hand the lower clamp plates 94 and 95 are provided with threaded openings which are able to engage the corresponding thread of the shafts of the bolts 97 and 98 passing there into through the slot between the tracks of the rail element 67. As may be understood rotation of the bolts 97 or 98 in one direction will tend to tighten a respective clamp plate to the rail element 67 for fixing a respective alignment component 64 or 66 to the rail element 67 while rotation in the opposite direction will tend to loosen the grip of the clamp plates on the rail element 67 so that the alignment component 64 or 66 may be displaced as desired along the rail. The position of the slide bar arms 76 and 77 is thus adjustable.

As is shown in FIG. 18, both slide bar arms 76 and 77 are able to be maintained at an angle of 45 degrees with respect to the direction of travel of the conveyor belt such that the bands 60 and 62 being fed thereto at an angle more or less perpendicular to the direction of travel of the conveyor belt 50 are able to change direction and be deposited in parallel spaced relationship onto the protective film 55. The adjustability of the band alignment components 64 and 66 means that they can also be moved to different positions in order to produce panels of different width (e.g. panels having a width of 32", 36" or 48" wide boards).

The bands 60 and 62 may for example be aligned so that their edges are not outside the edges of the protective film 55. The distance between the outer edges of the bands 60 and 62 and the outer edges of the protective film 55 may for example be from 0" to 0.5".

Referring now to FIG. 19 the apparatus has a first broad face reinforcement deposit station for depositing a bottom or lower mesh layer onto the protective film 55 and the bands 60 and 62. The first broad face reinforcement deposit station has a first mesh layer alignment component for depositing the bottom or lower layer of reinforcement mesh 100 onto the protective film 55 so as to overlap portions of each of the above mentioned side edge reinforcement bands 60 and 62. For the present example apparatus the lower layer of the reinforcement mesh 100 is sized and centered so that the distance between the outer edges of the reinforcement mesh 100 and respective outer edges of the reinforcement bands 60 and 62 are more or less the same. The lower layer of reinforcement mesh 100 may be of fiberglass or polypropylene.

The first mesh layer alignment component comprises an alignment bar 102 as well as support members 104 and 105 which maintain the alignment bar 102 a predetermined desired distance above the conveyor belt 50. The support members 104 and 105 may be adjustable or non-adjustable as desired or necessary.

In FIG. 19 the support members are shown as being adjustable such that the alignment bar may be displaced upwardly and downwardly as well as forwardly in the direction of travel of the conveyor belt and backwards in the opposite direction. The following description will be given with respect to support member 104 but the same reference numbers will be used to designate the common elements of support element 105.

It should be appreciated that proper mesh embedment depth within cementitious board is ideal when the mesh itself is not visible but the pattern it creates on the top surface of the cementitious board is slightly visible. If the mesh is embedded too deep in the cementitious board, aesthetics and cutting problems will arise when manipulated in its intended use. If the mesh is not embedded enough, the mesh will fail to provide the reinforcement qualities for which it was added. In at least one embodiment of the present disclosure, the alignment bar 102 and/or other components used in mesh depositing will vibrate to assist in achieving a desired embedment depth by making the cementitious board surface appear more uniform, which avoids streaks and build-up. Any type of vibration may be used, including electrically driven motor equipped vibrators with unbalanced cam shafts, pneumatic turbine vibrators using eccentric working unbalanced moment, pneumatic piston vibrators, or any other type of vibrator that is able to produce rotary vibration or other type of vibration. In a preferred embodiment, more than one vibrating station is used to assist in application and embedment of the reinforcing mesh. In such an embodiment, each vibration station is equipped with one or more vibrating screeds or bars with a width ranging between and including 4 inches to 12 inches with a length similar to the width of the cementitious board being manufactured.

In at least one embodiment of the present disclosure, vibration is applied to a slurry or a core mix to assist in partial embedment of reinforcing mesh. In such an embodiment, the vibration of the slurry or the core mix over the reinforcing mesh is at a rate high enough to assist in the creation of a strong bond between the reinforcing mesh and the slurry or core mix but a rate low enough so as not to embed the reinforcing mesh too deep into the slurry or create segregation of the core mix components.

In at least one embodiment of the present disclosure, vibration is applied to a slurry or core mix to assist in partial embedment of reinforcing mesh wherein the slurry or core mix is comprised of lightweight aggregate, such as, for example, small-diameter and/or large-diameter expanded closed-cell polystyrene beads. It should be appreciated that the use of any expanded closed-cell polystyrene bead may hinder the proper depth embedment of reinforcing mesh into a forming slurry or core mix. It should further be appreciated that this hindrance is accentuated through the increasing use of small-diameter expanded closed-cell polystyrene beads. It should be appreciated that the small-diameter expanded closed-cell polystyrene beads, without such vibration, may cause a non-uniform thickness of forming cementitious panel such that application of a reinforcing mesh occurs at a non-ideal depth. It should further be appreciated that the small-diameter expanded closed-cell polystyrene beads, with too great of vibration, may cause the small-diameter expanded closed-cell polystyrene beads to pass through the reinforcing mesh and, therefore, create a non-uniform thickness or aesthetic appearance of forming cementitious panel such that application of a reinforcing mesh occurs at a non-ideal depth.

In at least one embodiment of the present disclosure, the use of vibration to the slurry or core mix containing such lightweight aggregates enables the embedment of reinforcing mesh into the slurry or core mix to form a cementitious panel with reinforcing mesh at a proper embedment and, therefore, high durability and easy cut-ability.

It should be appreciated that the amount and length of vibration necessary to assist in mesh embedment may vary depending on the core mix recipe. If too much vibration is used for too long of a duration, segregation of the core components may occur. For example, lightweight aggregates, such as, for example, expanded closed-cell polystyrene beads may float to the top of the board while heavier components, such as, for example, cement, will be pushed to the bottom of the board, thereby creating a possible delamination effect, and/or technical or aesthetic problems.

In at least one embodiment of the present disclosure, there may be one to several working stations and/or process stations to assist in the embedment of reinforcing mesh in a core mix or slurry. In such an embodiment, each of the stations is equipped with one or three vibrating screeds, bars, trowels, rods, plates, or other apparatus that may create a contact with a top of a core mix moving downstream on a conveyor. In at least one embodiment of the present disclosure, the vibrating apparatuses provide a uniform distributed weight to the core mix of 35 to 70 lb/sq. ft. In a preferred embodiment, each vibrating apparatus provides a uniform distributed weight to the core mix between 45 to 60 lb/sq. ft. In a preferred embodiment, each vibrating apparatus has a width of four inches to twelve inches, with an ideal width of six inches to nine inches, and a length similar to the width of the desired width of the forming cementitious board.

In at least one embodiment of the present disclosure, a core mix resides under a vibrating apparatus between 0.5 seconds and 3.0 seconds. In a preferred embodiment, a core mix resides under a vibrating apparatus between 0.75 seconds and 1.8 seconds. It should be appreciated that the core mix may reside under one or more vibrating apparatus for any length of time.

Referring to FIGS. 19, 19*a*, 19*b* and 19*c* the support member 104 has an upright support element 107 provided at the top thereof with a crown element 108 fixed thereto having a threaded channel. The support member 104 has a first crank 109 provided with a threaded shaft 110, a crank handle 111 at one end and at the other distal end an abutment head 112. The threaded shaft 110 is in screw engagement with the threaded channel of the crown element 108. The abutment head 112 is rotatably attached to a further crank body by fixing the outer shell 115 of a bearing member to the crank body 114 and fixing the inner bearing element 116 which is rotatable with respect to the outer shell 115, to the abutment head 112. In this way rotation of the crank 109 in one direction will cause the head 112 to rotate and push against the crank body 114 while rotation in the opposite direction will cause the head 112 to pull the crank body 114. The support member 104 includes an additional or second crank 117 which is connected in analogous fashion to the crank body 114 and an alignment bar attachment member 119 which in turn is attached to the alignment bar 102 such that rotation of the crank 115 through the crank body 114 either induces the bar 102 to be raised or to be lowered. With respect to the second crank 115, the same reference numbers are used to designate elements which are common with the first crank 109.

Figures 19A, 19B, 19C:
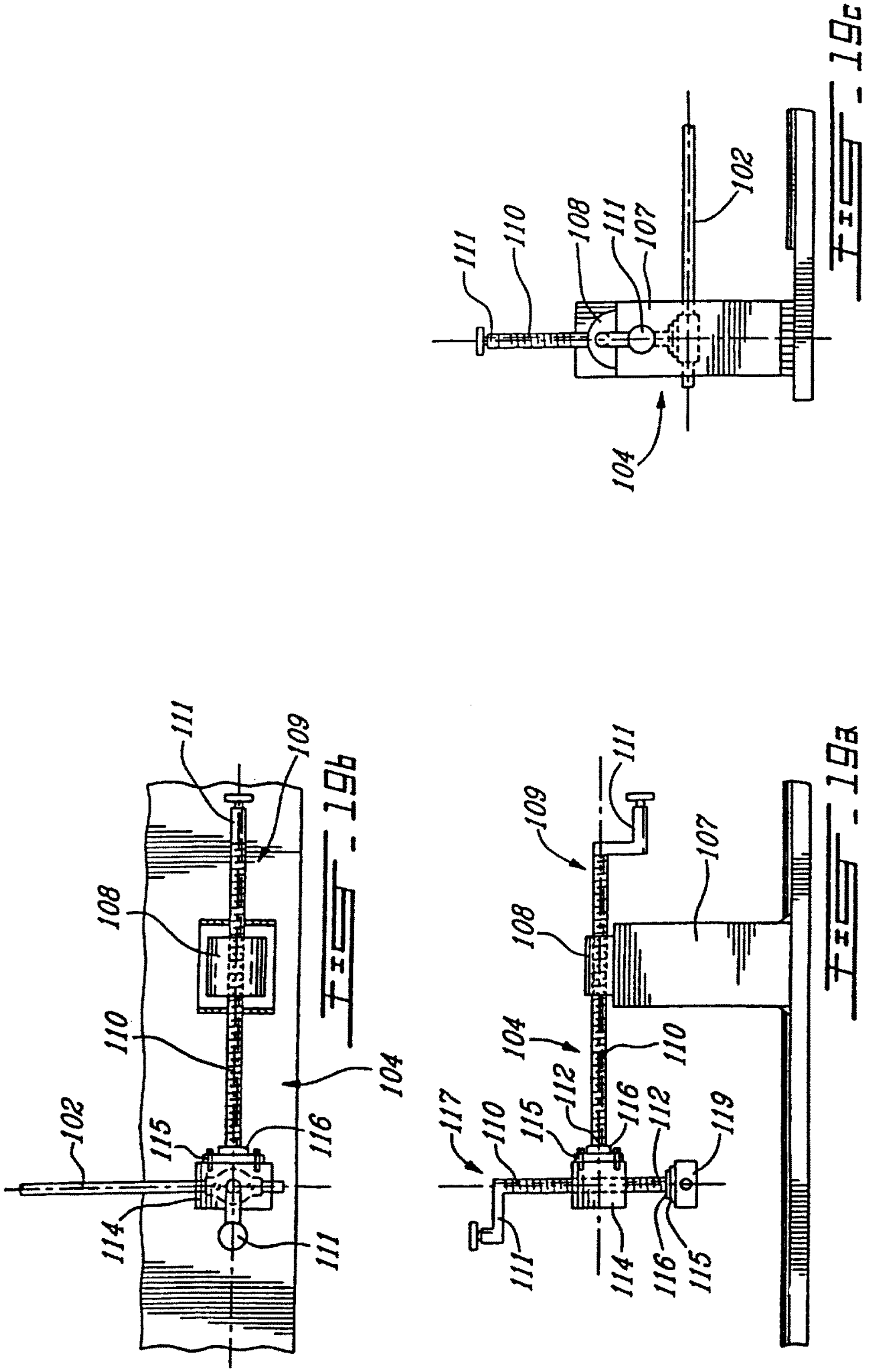
FIG. 19*a* is a schematic enlarged side view of the crank system for a support member of the first mesh layer alignment component shown in FIG. 19 and which includes dual crank components.
FIG. 19*b* is a schematic enlarged top view of the crank system shown in FIG. 19*a;*
FIG. 19*c* is a schematic enlarged end view of the crank system shown in FIG. 19*a;*

FIGS. 19*a*, 19*b* and 19*c* show in detail the above described dual crank system for the support member 104.

The apparatus has a slurry station comprising a pair of slurry edger rail elements 121 and 122, a slurry scrapper or screed bar element 125 and a slurry delivery system. The purpose of the slurry station is to facilitate adherence of the reinforcement mesh 100 to the core mix by first embedding the mesh 100 in a slurry layer prior to the deposit of the core mix thereon; this slurry layer will also serve to create a smooth side face for the panel. However if desired this slurry station may be omitted. If the slurry station is omitted other steps may have to be taken to ensure that the reinforcing mesh is adhered to the panel surface in the desired or necessary fashion e.g. by being embedded therein. For example, the formulation of the concrete mix may be modified so as to facilitate the embedding of the bottom mesh therein; please see U.S. Pat. No. 5,221,386 column 8 lines 1 to 31 for a description of such a potential core mix; the entire contents of this patent are hereby incorporated by reference.

The slurry edger rail elements 121 and 122 are directly attached to the table 54 by connector elements 128 and 129 and indirectly by elements 130 and 131 attached to legs 134 and 135 of a support structure 137 for supporting a slurry holding container 140. The edger rail elements 121 and 122 are fixed in place such that the lower edge of each of the edger rail elements 121 and 122 is spaced apart from the table 54 a distance sufficient to allow the conveyor belt 50, protective film 55 and any desired layer or layers of reinforcing mesh to pass between. This distance however is such that the slurry deposited on the lower mesh 100 is inhibited from spreading laterally beyond these edger rail elements 121 and 122. The edger rail elements 121 and 122 are also spaced apart a desired predetermined distance so as to assure that a predetermined constant width of slurry is deposited on the lower mesh 100.

The slurry scrapper or screed bar element 125 is attached to the support structure 137 for the slurry holding container 140 by support arms 142 and 144 such that the lower edge of the screed bar element 125 is spaced apart from the table 54 so as to define a screed distance (i.e. a nip) sufficient to allow the conveyor 50, a protective film 55 and any desired layer or layers of reinforcing mesh to pass there between. This screed distance however is such that the slurry deposited on the lower mesh 100 and which passes under the screed bar element 125 forms a slurry layer of predetermined depth in which the lower mesh 100 is more or less embedded. The screed bar element 125 may be of rubber.

As may be appreciated, the slurry edger rail elements 121 and 122 and the slurry scrapper or screed bar element 125 form a type of U-shaped raised barrier dam structure having lower edges which are spaced apart from the table sufficient above described respective spacing distances. By suitable manipulation and synchronization of the speed of the conveyor belt 50 and the flow rate of slurry onto the lower mesh 100 more or less at the mouth of the dam, slurry suitably deposited on the lower mesh 100 may be made to backflow and create an upstream slurry pool 145 within the U-shaped barrier dam which may be generally deeper than these spacing distances. In this manner a slurry layer may be continuously laid down in which the lower mesh 100 is embedded. The slurry delivery system comprises the slurry holding container 140, an agitator 147 and a controllable slurry outlet member indicated generally by the reference number 150. The slurry holding container 140 is supported by the support structure 137, the container 140 being attached to the support structure 137 in any suitable fashion e.g. bolting. The agitator is connected to a motor (not shown) for rotation of the agitator. The components of the slurry may be mixed together in a separate container (not shown) and thereafter be delivered to the slurry holding container 140 in any suitable fashion (e.g. through appropriate ducting or manually); once in the slurry holding container 140 the agitator functions to maintain the slurry in a more or less homogenous mixed state prior to its being released onto the lower mesh 100. Alternatively, if desired or as necessary the slurry components may be delivered in any suitable fashion directly to the slurry holding tank 140 where they may be mixed due to the influence of the rotating agitator 147. The controllable slurry outlet member 150 may include a valve (not shown), such as a gate valve, which may be (spring) biased in a closed position. The valve may be connected to a solenoid type means whereby in response to an electrical signal the valve may be opened so as to release slurry onto the lower mesh 100 at timed intervals synchronized with the movement of the lower mesh 100 thereunder. The outlet member 147 is disposed such that the slurry deposited on the lower mesh 100 may be maintained within the confines of the above described U-shaped barrier dam and form the above mentioned slurry pool 145.

The apparatus also has a core mix station which is similar in general makeup to the slurry station. The core mix station comprises a pair of core mix edger rail elements 155 and 156, a core mix screeding roller component 158 and a core mix delivery system. The purpose of the core mix station is to deposit core mix onto the slurried lower mesh 100 so as to form a core mix layer covering the breadth of the lower mesh.

The core edger rail elements 156 157 are directly attached to the table 54 by connector elements 159 and 160 and indirectly by elements 161 and 162 attached to legs 164 and 165 of a support structure 167 for supporting a screed roller 170 such that the lower edge of each of the rail elements 156 and 157 is spaced apart from the table 54 a distance sufficient to allow the conveyor 50, protective film 55 and any desired layer or layers of reinforcing mesh to pass there between. This distance however is such that the core mix deposited on the slurried lower mesh is inhibited from spreading laterally beyond these edger rail elements 156 and 157. The edger rail elements 156 and 157 are also spaced apart a desired predetermined distance so as to assure that a constant width of core mix is deposited on a slurried lower mesh. The core edger rail elements 156 and 157 may be of high molecular weight polyethylene.

The core mix screeding roller component comprises a screed roller 170 and the support structure 167 for holding the roller 170 in place. The roller 170 may have a (poly) urethane covered surface. The roller 170 has shaft elements 172 and 174 fixed at opposed ends thereof. These shaft elements 172 and 174 are each engaged in respective bearing means (not shown) provided in the cross members 176 and 178; these bearing members allow the screed roller 170 to be rotated about a longitudinal axis. The shaft 172 is attached to a motor (not shown) for urging the clockwise rotation of the screed roller 170; the motor is suitably configured for example to rotate the screed roller 170 clockwise in the same direction as the conveyor belt 50 but at a speed slower than the speed of the conveyor belt 50.

The screed roller 170 may be fixed in place or be vertically adjustable so as to vary the nip between the roller and the conveyor belt. In FIG. 19 the screed roller is illustrated as being vertically adjustable.

The cross members are vertically displaceable by a crank system analogous to that shown in FIGS. 19*a*, 19*b* and 19*c* such that the screed roller 170 may be displaced up and down so that the nip between the roller 170 and the conveyor belt 50 may be set to the desired core mix layer thickness. The crank system includes a single crank component (the cranks being designated by the reference numbers 180 and 181). The side ends of the cross members 176 and 178 are each provided with key elements slidably engaged in slots on the inside parts of the roller support structure 167; one of the slots is designated with the reference number 184.

As may be appreciated, the screed roller 170 and core mix edger rail elements 155 and 156 also form a type of U-shaped raised barrier core mix dam structure having lower edges which are spaced apart from the table 54 sufficient above described respective spacing distances. By suitable manipulation and synchronization of the speed of the conveyor belt 50 and the flow rate of core mix onto the lower mesh more or less at the mouth of this core mix dam, core mix suitably deposited on a lower mesh may be made to backflow and create an upstream core mix mass 190 within the U-shaped barrier dam which may be generally deeper than these spacing distances, (i.e. in particular deeper than the screed roller nip). In this manner a core mix layer 191 may be continuously laid down over the slurried lower mesh.

The core mix delivery system comprises the core mix holding container 192, an agitator 193 and a controllable core mix outlet member indicated generally by the reference number 195. The core mix holding container 192 is supported by the support structure 196. The agitator 193 is connected to a motor (not shown) for rotation of the agitator. The components of the core mix may be the same as for the slurry but including lightweight aggregate and normal weight aggregate and if desired an air entraining agent or other desired or necessary components.

In at least one embodiment of the present disclosure, the core mix contains expanded closed-cell polystyrene beads as a lightweight aggregate. In a preferred embodiment, the core mix contains a mix of small-diameter and large-diameter expanded closed-cell polystyrene beads as the lightweight aggregate. It should be appreciated that closed-cell polystyrene beads require multiple passes through heated steam in order to achieve expansion suitable for inclusion in a core mix. A small-diameter closed-cell polystyrene beads must pass through heated steam at least twice to achieve the necessary expansion, with a one to two hour drying time between passes. Therefore, a small-diameter closed-cell polystyrene bead may not be suitable for inclusion in core mix without two full passes through heated steam and drying time of up to four hours. It should be appreciated that these multiple passes and associated drying time creates unnecessary delay in the cementitious board creation process. In some instances, enabling a multiple-pass facility for such beads within a plant without incurring additional delay to the cementitious board process would require the construction of new or expanded facilities at great cost and each additional pass through heated steam would incur expense.

In at least one embodiment of the present disclosure, small-diameter closed-cell polystyrene beads may be expanded in a one-pass process to the appropriate size. In such an embodiment, the small-diameter closed-cell polystyrene beads have an unexpended diameter range between 0.015 inches to 0.028 inches with a desired expanded range between 0.03 inches to 0.125 inches. In such an embodiment, each closed-cell polystyrene bead is preferably lubricated with a hydrophobic agent (i.e. calcium stearate).

In such an embodiment, the closed-cell polystyrene beads undergo a heated steam, with pressure ranging from 3 to 7 psi and a temperature ranging between 220 Fahrenheit to 240 Fahrenheit. In at least one embodiment of the present disclosure, after the conclusion of the heating process, the beads are sprayed with an antistatic agent to prevent static electricity from forming. In such an embodiment, the anti-static agent may include anti-static agents commonly known to those of skill in art, such as, for example, larostat 519f, Arquad 2ht-75, Atmer, and/or household fabric softeners and commercial or industrial surfactants, such as Alpha Olefin Sulfonates. In such an embodiment, the beads may be sprayed with a hose attached to a pressure tank containing the anti-static agent, may be submerged in the anti-static agent, or other method such that the anti-static agent is applied to the beads thoroughly.

In at least one embodiment of the present disclosure, the components of the core mix, including any lightweight aggregates, may be mixed together in a separate container (not shown) and thereafter be delivered to the core mix holding container 192 in any suitable fashion (e.g. through appropriate ducting or manually); once in the core mix holding container 192 the agitator functions to maintain the core mix in a more or less homogenous mixed state prior to its being released onto the slurried lower mesh. Alternatively, if desired or as necessary the core mix components may be delivered in any suitable fashion directly to the core mix holding tank 192 where they may be mixed due to the influence of the rotating agitator. The controllable core mix outlet member 195 may include a motorised archimedes screw for delivering core mix onto the slurried lower mesh at timed intervals synchronized with the movement of the slurried lower mesh thereunder; the rotation of the screw may for example be controlled by a timer mechanism which controls the energization and denergization of the screw motor. The outlet member 195 is disposed such that the core mix deposited on the slurried lower mesh may be maintained within the confines of the above described U-shaped barrier core mix dam and form the above mentioned core mix mass.

It should be appreciated that the use of lightweight aggregates and/or introduction of air bubbles from use of surfactants decreases the weight of a core mix such that it may have a tendency to stick to the screed roller 170. It should be appreciated that the stickiness may occur through a suction effect created between the screed roller 170 and the core mix of a given rheology. In at least one embodiment of the present disclosure, a forming wire may be affixed to the system adjacent to the screed roller 170 to limit the suction effect created by a lightweight core mix and assist in maintaining a smooth top surface of resulting cementitious board.

Figure 19D:
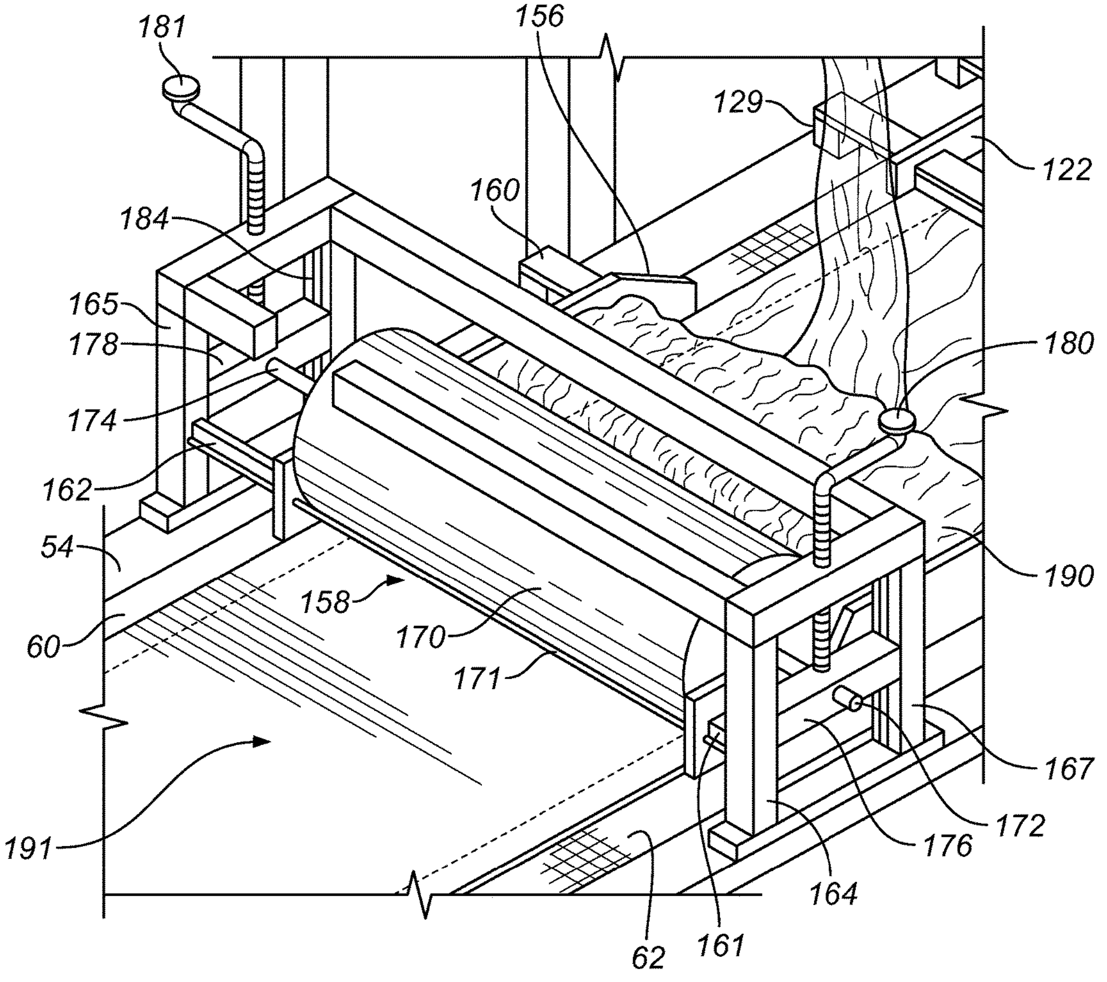
FIG. 19*d* is a schematic enlarged view of the roller and accompanying forming wire to be used with the system shown in FIG. 19.

Referring now to FIG. 19*d*, it is shown an enlarged view of a screed roller 170 with a forming wire 171 according to at least one embodiment of the present disclosure. As shown in FIG. 19*d*, in at least one embodiment of the present disclosure, a forming wire 171 may be affixed to legs 164 and 162 and run parallel to the screed roller 170 at a close proximity. In a preferred embodiment, legs 164 and 162 may be adjusted up or down to adjust the thickness of extruding board and the forming wire 171 moves with the legs to remain at the same proximity to the screed roller 170. It should be appreciated that the forming wire 171 may be affixed to any component within the system shown in FIG. 19 such that it provides the same or similar properties as described herein. The forming wire 171 may also stand independent from any component described herein.

In at least one embodiment of the present disclosure where a forming wire 171 is included, the forming wire 171 catches, slices or guides the core mix after passing under the screed roller 170 and assists in preventing the core mix from sticking to the screed roller 170. In a preferred embodiment, the forming wire 171 is made of music wire, piano wire, or steel wire with a diameter ranging from 0.020 inch to 0.030 inch and of a length sufficient to cover the entire length of the screed 170. It should be appreciated that it is within the scope of the present disclosure for the forming wire 171 to be made of any material such that it provides the properties of limiting suction of lightweight core mix as described herein. For example, it is within the scope of the present disclosure for the forming wire 171 to be a roller that rotates with the screed roller 170 and provides the same suction limiting effect. It is further within the scope of the present disclosure for the forming wire 171 to be a metal rod or other apparatus running parallel to the screed roller 170 such that the effect of suction of a lightweight core mix to the screed roller 170 is reduced. Nevertheless, it should be appreciated that a wire is advantageous because it prevents sticking on the screed roller 170 by acting as a slicer, similar to a wire cheese cutter which cleanly cuts cheese as opposed to a doctor blade which may provide cuts but leave residue on the blade thereafter. It should be appreciated, then, that the wire is small enough in a preferred embodiment to enable cutting of the extruding board while not accumulating concrete on its surface and not block extruding board passing underneath the screed roller 170. It should be further appreciated that the preferred embodiment has a wire of a diameter large enough to avoid rupturing and also prevent excessive wear in an abrasive environment.

It should be appreciated that the forming wire may be made of steel, piano wire, music wire, copper wire, or any other substance. In a preferred embodiment, the forming wire is composed of steel with a diameter of about 0.020 inch to 0.030 inch. It should be appreciated, of course, that the forming wire may be of any diameter.

In at least one embodiment of the present disclosure, the forming wire 171 rests at a position in the range of 0" to 2" downstream of the center of the screed roller's 170 vertical position. In a preferred embodiment, the forming wire 171 is adjusted so it sits just slightly above the extruded board surface while at the same time slightly touching the screed roller 170. In such a preferred embodiment, the forming wire 171 is of a wire tension great enough to remain straight when the screed roller 170 is turning and board surface is extruding. It should be appreciated that it is within the scope of the present disclosure to position the forming wire 171 at any range downstream of the screed roller 170 such that it makes connection with the extruding board and provides a suction limiting effect as described herein for a lightweight core mix.

Figure 19E:
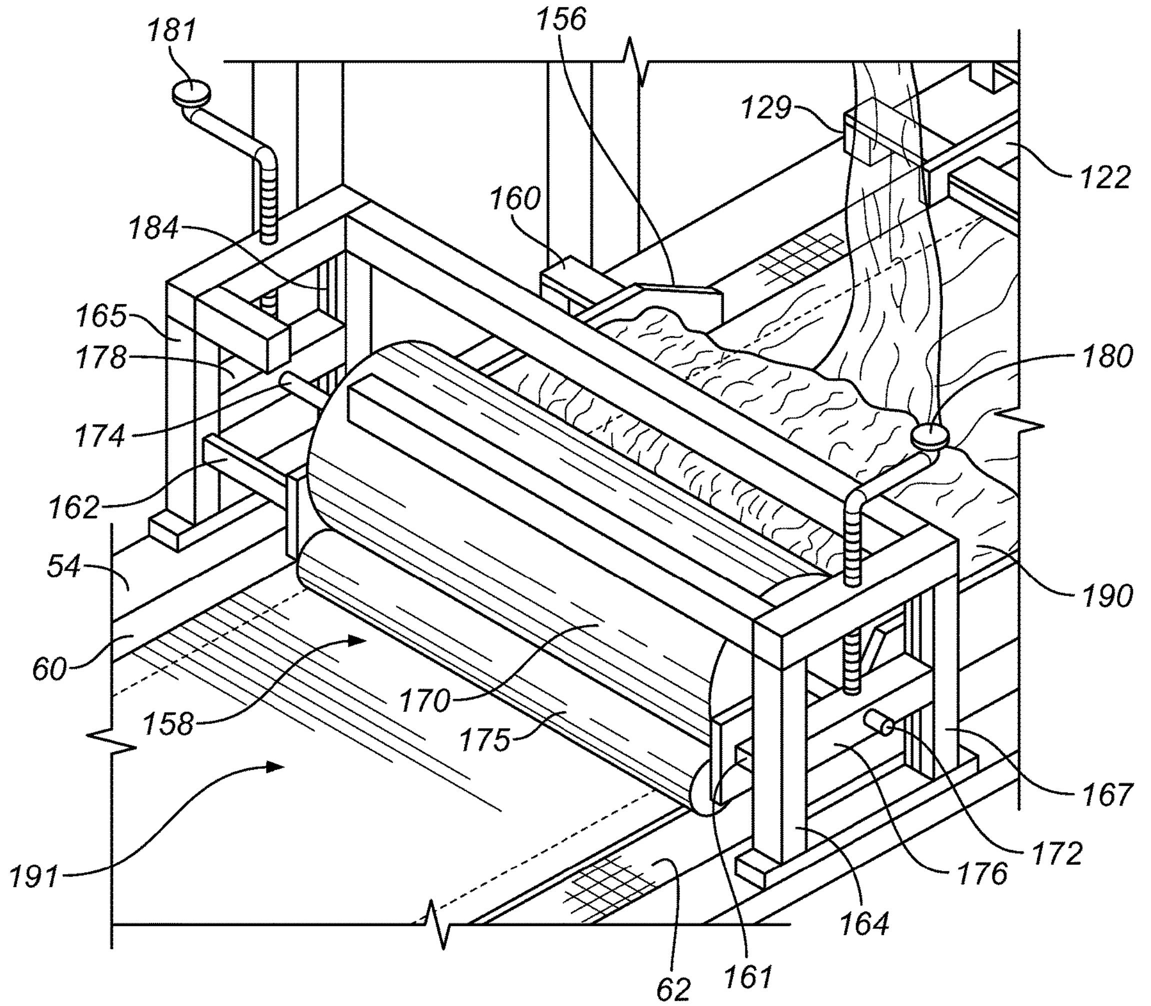
FIG. 19*e* is a schematic enlarged view of the roller and accompanying rotating rod to be used with the system shown in FIG. 19.

Referring now to FIG. 19*e*, it is shown a rotating rod 175 to prevent accumulation of lightweight core mix according to at least one embodiment of the present disclosure. In at least one embodiment of the present disclosure, the rotating rod 175 rotates with the screed roller 170 and is in slight contact with the screed roller 170 such that it removes any excessive core mix from the extruding board without incurring great wear. In a preferred embodiment, the rotating rod 175 has a small diameter in a range of 1/16 inches to 1/3 inches and turns at a rate in the range of 250 revolutions per minute to 300 revolutions per minute. In such an embodiment, the rotating rod 175 provides similar functionality to the forming wire 171 shown in FIG. 17*d* but is advantageous in that it is less resistant to wear and breakage. For example, a forming wire 171 shown in FIG. 17*d* may break unexpectedly and require stoppage of formulation of cementitious board whereas a rotating rod 175 shown in FIG. 17*e* is more resistant to wear and incurs less breakage. The rotating rod may also be shaped or profiled instead of being uniform in diameter.

In at least one embodiment of the present disclosure, one or more thinning plates 173 may be affixed under the screed roller 170 near the edges of the extruding board to shape the extruded board to be thinner than if the thinning plates 173 were not present. In a preferred embodiment, the thinning plates 173 are made of steel and positioned adjacent to or affixed to legs 162 and 161. It should be appreciated that the thinning plates 173 provide thinner edges for the extruding board while maintaining smoothness. It should be appreciated that it is within the scope of the present disclosure for any type of apparatus to be affixed in a manner that provides thinning as described herein. For example, tape may be affixed to a support roll (not pictured) underneath the screed roller 170 on the edges of the extruding board to provide such thinning. The support roll may also for example be shaped with a specific profile. In another example, wood, plastic, or other element may be used. In a preferred embodiment, the thickness of the thinning plates 173 or combined thicknesses of other components used to provide the same effect (i.e. tape) is between 0.030 inch to 0.060 inch.

Turning to FIG. 20 the apparatus has a second broad face reinforcement deposit station for depositing a bottom or lower mesh layer onto the core mix layer.

The second broad face reinforcement deposit station has a layer alignment component for depositing a top or upper layer of reinforcement mesh 200 onto the core mix. For the present example apparatus the top layer of the reinforcement mesh 200 is sized and centered so that the distance between the outer edges of the top reinforcement mesh 200 and outer edges of the reinforcement bands 60 and 62 are more or less the same as that for the lower layer of reinforcement mesh 100. The top layer of reinforcement mesh 200 may be of fiberglass or polypropylene.

The top or upper mesh layer alignment component comprises the same type of elements as the above described lower mesh layer alignment component so the same reference numerals designated the common components. Essentially the top or upper mesh layer alignment component comprises an alignment bar 102 as well as a dual crank system as described above for adjusting the position of the bar 102.

Still referring to FIG. 20 the apparatus has a finishing station. The finishing station comprises a pair of guide fork elements 211 and 212, a pair of opposed finishing edge rail elements 214 and 216, a floatable screed plate member configured to vibrate 220 and a pair of edge compression ski components 222 and 224.

The guide fork elements 211 and 212 each comprise gibbet like support members and a prong end having a pair of downwardly extending prongs or fingers generally designated by the reference numerals 226 and 227. The gibbet like support members are attached to the table.

The finishing edger rail elements 214 and 216 each have guide flange ends 230 and 232 which taper in the upstream direction such that the inner face tapers towards the outer face thereof and the top face tapers downwardly. The tip ends (one of which is designated with the reference number 234) of the guide flange ends 230 and 232 are each disposed more or less just below the prong end of a respective guide fork element 211 and 212, i.e. just below the gap between the two prongs. The guide fork elements 211 and 212 and the guide flange ends 230 and 234 cooperate to urge marginal mesh regions as well as the marginal regions of the protective film from an initial horizontal position upwardly to a vertically extending position from which distal edges thereof may then be bent inwardly and downwardly under the influence of the floatable screed plate member 220.

The finishing edger rail elements 214 and 216 are attached to the table by connector elements 236, 237, 238 and 239 such that the lower edge of each of the finishing edger rail elements is spaced apart from the table 54 so as to define a nip sufficient to allow the conveyor belt to pass there. The rail elements are also spaced apart a desired predetermined distance so as to assure that the inner surface thereof may sliding abut respective panel side edges. If desired the finishing edger rail elements 214 and 216 may be fixed in place by the above mentioned connector elements. However, if desired the edger rail elements may be laterally adjustable in order to accommodate panels of different width. For example the connector elements may have outer shell and an inner telescoping member and an adjustment bolt; these elements by way of illustration are designated with respect to connector 237 respectively by numbers 250 251 and 252. The bolt may be suitably attached in any manner to the back of the outer shell so that rotation of the bolt in one direction will induce the edger rail element 214 to move laterally inward while a reverse rotation will induce a laterally outward displacement of the edger rail element 214.

The vibratable floatable screed member 220 comprises an elongated plate 260 and a vibrator 265 (e.g. a compressed air turbine vibrator) for inducing the plate 260 to vibrate up and down. The vibrator is connected to a suitable energization source (not shown). The plate 260 extends between the inner surfaces of the finishing edger rail elements 214 and 216 and is sufficiently long so as so as to overlap top marginal regions of the top broad face of the panel being made. The floatable screed member 220 is made of a relatively light weight material so that it is able to essentially float over the upper top mesh and yet be able to ride over distal parts of the side edge meshes and protective film as the panel passes thereunder, i.e. so as to complete the inward and downward bending of distal edges of the side edge meshes. The plate 260 may for example weigh from 20 to 60 pounds, be 3" to 9" wide, and be of aluminum. The vibratable floatable screed member 220 is maintained in position against the movement of the panel there underneath by bumper or stop elements 270 and 271 which may have rubberized tips 272 and 273. The vibrator 265 may vibrate the plate 260 so as to induce the upper mesh as well as the bent over edge mesh portions overlapping the upper mesh to become embedded in surface of the core mix layer.

As mentioned the protective film and the bands are turned upside-down (folded) along the board's edges; the folded over webs are designated by the reference number 221. Advantageously, sufficient distance (for example 10 to 20 feet) is provided between the screed roller and the vibrating bars such that the band may be folded naturally, releasing the tension that can cause the band to spring out of the board's surface. The finishing edger rail elements may start for example from 20 to 5 feet before the vibrating plat. These edger rail elements 214 and 216 help the protective film and the bands to be folded without ripples or uneven tension and inhibit the changing of the board dimensions when subject to the aforementioned under vibrations.

The apparatus has a pair of edge compression ski components 222 and 224 for smoothing out the edge regions and providing the edges with an outward taper (please see FIGS. 15, 16 and 17). The edge compression ski components 222 and 224 each comprise a ski shaped engagement element 275 or 276 for riding an edge of the panel. The ski shaped engagement elements 275 and 276 are fastened to a support bar 280 by respective brackets 281 or 282. The support bar 280 itself is suspended above and fixed to the table 54 on opposite sides of the conveyor belt 50 by upright support elements 285 and 286.

The ski shaped engagement elements 275 and 276 are each attached to respective brackets by a pair of nut/shaft systems. The following will describe one such nut/shaft system in relation to the component 222; the other nut/shaft systems are the same.

Referring to component 222 the nut/shaft system comprises a threaded shaft 290 and a pair of nuts; an upper nut being designated by the reference number 291. The threaded shaft 290 is attached at one end to the ski engagement element 275 and the other distal end engages a threaded channel in bracket 281; the distal end of shaft 290 extends through the threaded channel and engages the upper nut 291. The second nut engages the threaded shaft just below the bracket 281. The nuts may be made to releasably clamp the shaft 290 to the bracket 281 by suitable rotation thereof in opposite directions. By displacing the nuts along the shaft the ski engagement element may be made to exert more or less pressure on the adjacent panel edge. One of the nut/shaft systems of component 222 may be used to vary the pressure of the ski shaped engagement element on the outboard side of the edge and the other nut/shaft system may be used to vary the pressure on the inboard side of the same edge; in general more pressure is applied to the outboard side of the edge than the inboard side thereof so that an edge has a somewhat outwardly tapered shape (please see FIGS. 15 to 17). Additionally the ski engagement element 275 is disposed such that the ski like tip thereof is upstream relative to the other end thereof and the longitudinal axis of the ski element is disposed transversely with respect the longitudinal axis of the panel. Although the mechanism for inducing the ski elements to press down on the edges has been described in terms of a nut/shaft system, any other type of biasing means may of course be used, e.g. a spring biased system, an hydraulic or pneumatic system or a free weight system.

Once past the finishing station the elongated panel product may be sent on the conveyor to any known type of curing station (e.g. a curing oven). After the curing station the panel may then be transferred from the conveyor belt to a cutting station where the panels are cut to size; prior to transferring the panel to the cutting station the protective film may be separated and recovered. Thereafter the cut panels may be sent to a stacking/packaging station where the panels may be moist cured for 3 to 7 days before shipping. The end drive roller for the conveyor belt may be located between the curing and cutting stations.

Referring to FIG. 21 this figure is the same as FIG. 18 but it additionally shows an example tape application station for application of an adhesive tape to the core side of the bands 60 and 62 so as to provide a panel in accordance with the present invention wherein the bridging member is not adhered to the core as described above. Since FIG. 21 is except as noted above the same as FIG. 18 FIG. 21 will not include all of the reference numbers of FIG. 18.

The tape application station includes a pair of rolls of tapes 300 and 301, a threaded tape support rod 302, a plurality of clamp nuts (each generally designated by the reference number 304), upright support members 306 and 308, tape alignment components 310 and 311, and tape pressure application components 313 and 315.

The rolls of tape include tape cores through which the tape support rod 302 may be threaded; a tape core is sized such that a roll of tape is freely rotatable about the support rod 302. A roll of tape (300 or 301) is maintained in essentially one predetermined position by being bracketed between adjacent clamp nuts 304. The upright support members 306 and 308 have upper openings through which the threaded rod 302 extends. The rod 302 is similarly maintained in place by clamp nuts 304. The alignment components each include a respective arm 320 and 321 which bring the tape to an initial close proximity to a respective underlying band (60 or 62) such that a subsequent upstream tape pressure application component 313 or 315 may press down on the tape such that the adhesive thereof causes the tape to be adhered to the band. The tape pressure application components 313 and 315 each respectively includes a contact element 327 or 328 hinged at one side to a respective support arm 322 or 323; the contact elements are biased by a respective bias spring 325 or 326 such that the side of the contact element opposite the hinged side thereof is biased so as to slide over the tape urging the tape into adhesive contact with the band (60 or 62). With the tape in place a panel as discussed with respect to FIGS. 13, 13 *a*, 14 and 14 *a* may be manufactured.

Instead of the above described tape mechanism one could use an analogous paint applicator, wax applicator etc.

FIG. 22 shows an example mechanism for feeding reinforcing strips or bands 60 and 62 to the apparatus forward end illustrated in FIG. 18. As may be seen rolls of mesh bands 330 and 340 are rotatably attached to shafts 345 and 346; the attachment may in any suitable fashion so as to be able to let out the bands as necessary. For example the rolls may have central cores 350 and 351 which may be able to slide over the shafts 345 and 346 in the manner of rotatable sleeves. The rolls may be maintained in place by a block arm releasably screwed to a respective shaft 345 or 346; the block arms inhibiting longitudinal axial movement of the rolls off of the shaft but not rotation movement about the shaft. The mechanism include 45 degree slide arms 360 and 370 for changing the direction of motion of the bands by 90 degrees as well as a base support structure 380 and 381.

Figure 23:
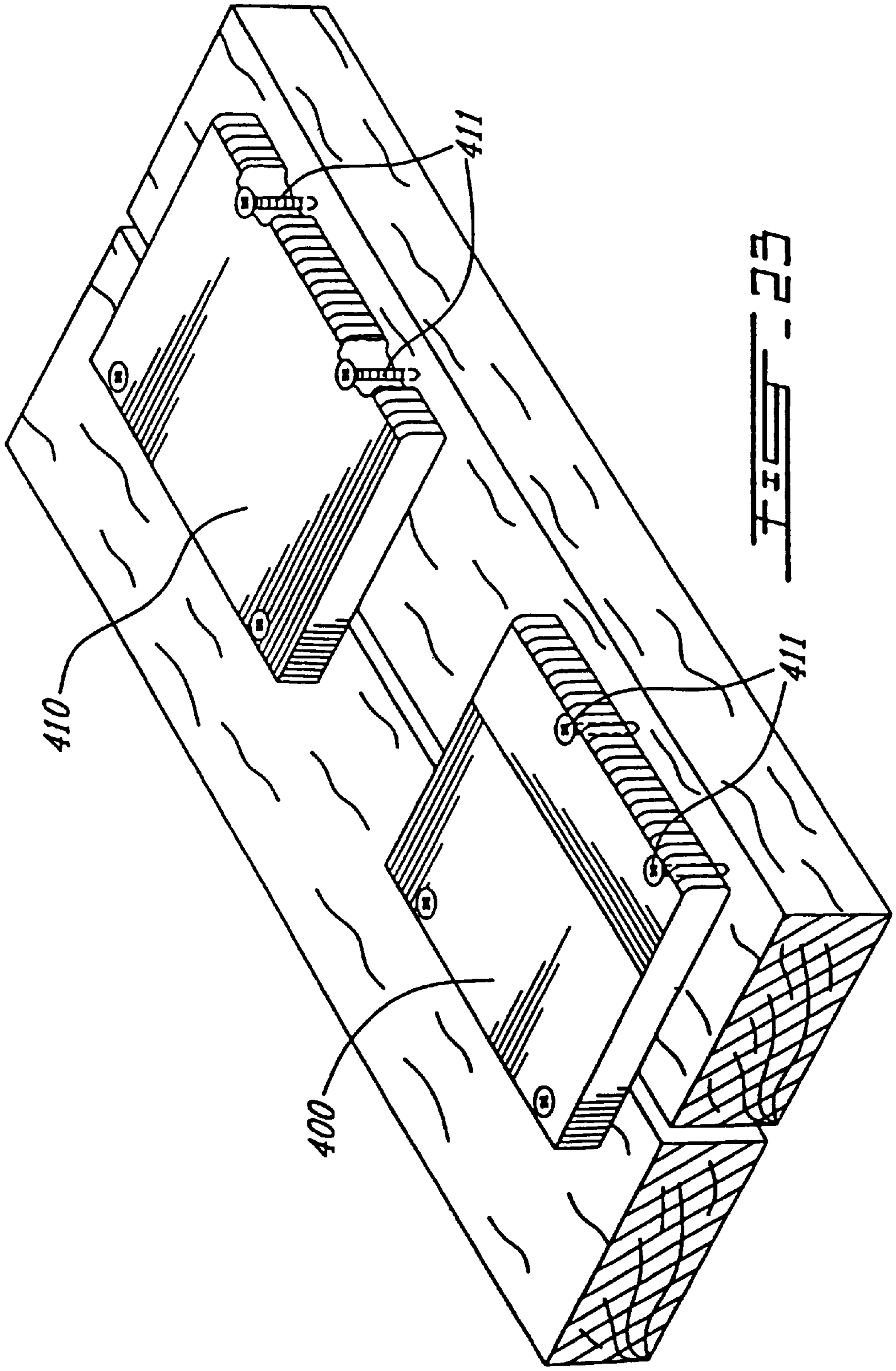
FIG. 23 illustrates in schematic perspective view an edge strength test for a panel section having an edge reinforcement in accordance with the present invention and a panel section having a known wrap around reinforced edge as illustrated in U.S. Pat. No. 5,221,386 the entire contents of which are incorporated herein by reference (see FIG. 6 of this patent).

FIG. 23 illustrates in schematic perspective view an edge strength test for a panel section 400 having an edge reinforcement in accordance with the present invention and a panel section 410 having a known wrap around reinforced edge such as illustrated in U.S. Pat. No. 5,221,386 the entire contents of which are incorporated herein by reference (see FIG. 6 of this patent). Both panels are screwed to spaced wood blocks by screws; screws 411 are shown as being just adjacent to the outer edge of each panel section. As may be seen the prior art panel 410 has edge failure but not the panel 400 of the present invention when applying a screw close to the edge. A panel in accordance with the present invention thus may permit the installation of fasteners close to the edge (0.5" or less) without damaging them and thus provide superior fastener pull resistance.

As may be appreciated from the above, in accordance with the present invention it is in particular for example, possible to manufacture a cement board having impact resistant edges by applying to the edge area of the board a continuous band of synthetic, alkali-resistant, non-woven fabric of sufficient strength and elasticity to completely cover the edge area of the board with a U-shaped reinforcing mesh without sacrificing the scoring ability of the latter. In accordance with the present invention it is possible, for example to obtain a cementitious board having smooth longitudinal edges which may be impact resistant by the addition of a U-shaped non-woven fabric not embedded nor below the longitudinal minor edge face, i.e. the reinforcing mesh in the region of the minor surface may abut or be alternatively cemented thereto.

As an example of a non-woven non-oriented mesh which may be used herein may be described as a polypropylene, staple fiber, needle punched, nonwoven fabric having the following characteristics:

i) Mass per unit area: 2.1 oz. per sq. yd.
ii) tensile strength at break: 25 pounds
iii) Elongation at break: 40 to 80 percent In addition to the previously provided examples of ingredients disclosed herein, the following tables give example compositions for the slurry and core mix as well as certain characteristic of a panel made in accordance with the present disclosure:

Board Characteristics for a nominal ½" thick board

| Physical test | Preferred value | Generic value |
|---|---|---|
| Unit weight | 2.3 lbs/sq. ft | 2.3 to 3.3 lb/sq. ft |
| Water absorption | 8.60% | 5 to 30% |
| Humidified deflection | 0" | 0 to 0.01" |
| Linear variation | 0.07% | 0 to 0.10% |
| Flexural strength | 1100 psi | 200 to 2000 psi |
| Nail pull resistance (wet) | 90 lbf | 50 to 200 lbf |
| Nail pull resistance (dry) | 90 lbf | 50 to 2000 lbf |
| Tapered edge depth | 0.060" | 0 to 0.2" |
| Squaring | 0 mm | 0 to 0.2" |
| Freeze/thaw resistance as % of loss | 0.32% | 0.32% |
| Fire resistance | 1 hr, 2 hrs | 45 minutes, 1 hr, 2 hrs, 3 hrs |
| Flame spread | 0 | 0-10 |
| Smoke density | 0 | 0-10 |
| Wind Load (½" × 4 × 8, studs 16" o.c.) | 40 psf | 30 to 100 psf |
| Bond strength of mortar | 50 psi | 50 to 300 psi |
| Sound transmission Class | 56* Stc | 45 to 65 stc |
| Bending radius | 5' | 0.5 to 8 feet |
| Falling ball impact | 12" | 5 to 16" |

We claim:

1. A process for the formation of highly durable cementitious board using lightweight aggregate, the process comprising:

pouring a core mix onto a conveyor, wherein the core mix is comprised of:

a lightweight aggregate filler in an amount of 0.5 to 5 weight percent of the core mix, the lightweight aggregate filler comprising a first plurality of expanded closed-cell polystyrene beads at a first quantity having an expanded diameter of 0.030 inches to 0.080 inches and a second plurality of expanded closed-cell polystyrene beads at a second quantity having an expanded diameter of 0.100 inches to 0.130 inches, the second quantity being between 25 percent and 50 percent of the first quantity;

one or more binders in an amount of 35 to 75 weight percent of the core mix;

rheological admixture in an amount of about 0.5 to 5 weight percent of the core mix;

surfactant in an amount of 0 to 0.1 weight percent of the core mix;

one or more normal weight aggregate filler in an amount of 5 to 50 weight percent of the core mix, the one or more normal weight aggregate filler being a single use or a combination use of sand, stone, crushed stone, limestone, shale, clay, recycled concrete, and granite; and water in an amount of 5 to 20 weight percent of the core mix;

passing the core mix under a screed roller to flatten the core mix to produce an extruding board with a desired thickness;

wherein a forming wire is adjacent to the screed roller, the forming wire having a predetermined diameter such that it prevents accumulation of the core mix on the screed roller and wherein the forming wire is located above the extruding board such that it assists in smoothing the extruding board.

2. The process of claim 1, wherein the forming wire is made of steel.

3. The process of claim 1, wherein the forming wire has the predetermined diameter between 0.020 inches to 0.030 inches.

4. The process of claim 1, wherein the conveyor has a conveying direction and the forming wire is zero to two inches downstream on the conveyor of the screed roller in the conveying direction.

5. The process of claim 1, wherein the forming wire touches the screed roller.

6. A process for the formation of highly durable cementitious board using lightweight aggregate, the process comprising:

pouring a core mix onto a conveyor, wherein the core mix is comprised of a plurality of lightweight aggregate filler in an amount of 0.5 to 5 weight percent of the core mix, the plurality of lightweight aggregate filler comprising a first plurality of expanded closed-cell polystyrene beads at a first quantity having an expanded diameter of 0.030 inches to 0.080 inches and a second plurality of expanded closed-cell polystyrene beads at a second quantity having an expanded diameter of 0.100 inches to 0.130 inches, the second quantity being between 25 percent and 50 percent of the first quantity;

passing the core mix under a screed roller to flatten the core mix to produce an extruding board with a desired thickness;

wherein a forming wire is adjacent to the screed roller, the forming wire having a predetermined diameter such that it prevents accumulation of the core mix on the screed roller and wherein the forming wire is located above the extruding board such that it assists in smoothing the extruding board.

7. The process of claim 6, wherein the forming wire is made of steel.

8. The process of claim 7, wherein the forming wire has the predetermined diameter between 0.020 inches to 0.040 inches.

9. The process of claim 8, wherein the conveyor has a conveying direction and the forming wire is between zero to two inches downstream of the screed roller in the conveying direction.

10. The process of claim 9, wherein the forming wire touches the screed roller.

11. A process for the formation of highly durable cementitious board using lightweight aggregate, the process comprising:

pouring a core mix onto a conveyor, wherein the core mix is comprised of:

a plurality of lightweight aggregate filler in an amount of 0.5 to 5 weight percent of the core mix, the plurality of lightweight aggregate filler comprising a first plurality of expanded closed-cell polystyrene beads at a first quantity having an expanded diameter of 0.030 inches to 0.080 inches and a second plurality of expanded closed-cell polystyrene beads at a second quantity having an expanded diameter of 0.100 inches to 0.130 inches, the second quantity being between 25 percent and 50 percent of the first quantity;

one or more binders in an amount of 35 to 75 weight percent of the core mix; rheological admixture in an amount of about 0.5 to 5 weight percent of the core surfactant in an amount of 0 to 0.1 weight percent of the core mix;

one or more normal weight aggregate filler in an amount of 5 to 50 weight percent of the core mix, the one or more normal weight aggregate filler being a single use or a combination use of sand, stone, crushed stone, limestone, shale, clay, recycled concrete, and granite; and water in an amount of 5 to 20 weight percent of the core mix;

passing the core mix under a screed roller to flatten the core mix to produce an extruding board with a desired thickness;

wherein a rotating rod is adjacent to the screed roller on a downstream side thereof having a desired thickness such that it prevents accumulation of the core mix on the screed roller by rolling with the screed roller wherein the diameter of the rotating rod is smaller than the diameter of the screed roller.

* * * * *